US012630679B2

(12) United States Patent
Ochi et al.

(10) Patent No.: US 12,630,679 B2
(45) Date of Patent: May 19, 2026

(54) PREPREG

(71) Applicant: Toray Industries, Inc., Tokyo (JP)

(72) Inventors: Takashi Ochi, Iyo-gun (JP); Ryohei Watari, Iyo-gun (JP); Atsuhito Arai, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 897 days.

(21) Appl. No.: 17/788,402

(22) PCT Filed: Dec. 10, 2020

(86) PCT No.: PCT/JP2020/046004

§ 371 (c)(1),
(2) Date: Jun. 23, 2022

(87) PCT Pub. No.: WO2021/131740

PCT Pub. Date: Jul. 1, 2021

(65) Prior Publication Data

US 2023/0048074 A1 Feb. 16, 2023

(30) Foreign Application Priority Data

Dec. 26, 2019 (JP) ................................ 2019-235865
Mar. 13, 2020 (JP) ................................ 2020-043995

(51) Int. Cl.
*C08J 5/24* (2006.01)
*C08L 63/00* (2006.01)

(52) U.S. Cl.
CPC ............... *C08J 5/243* (2021.05); *C08L 63/00* (2013.01); *C08J 2363/00* (2013.01); *C08J 2463/00* (2013.01); *C08J 2477/00* (2013.01); *C08J 2481/06* (2013.01)

(58) Field of Classification Search
CPC ....... C08L 63/00-10; C08J 2363/00-10; C08J 2477/00; C08J 5/243
See application file for complete search history.

(56) References Cited

U.S. PATENT DOCUMENTS

| | | | | |
|---|---|---|---|---|
| 7,709,582 | B2 | 5/2010 | Kouchi et al. | |
| 9,481,145 | B2 | 11/2016 | Hatanaka et al. | |
| 9,629,240 | B2 | 4/2017 | Hayashi et al. | |
| 9,765,194 | B2 | 9/2017 | Aral et al. | |
| 2013/0005855 | A1* | 1/2013 | Arai ......................... | C08J 5/243 523/427 |
| 2014/0162518 | A1* | 6/2014 | Shimizu ................ | D06M 15/55 442/175 |
| 2014/0342144 | A1* | 11/2014 | Nakayama ............... | C08J 5/248 428/220 |
| 2015/0210813 | A1* | 7/2015 | Arai ..................... | C08K 5/1515 428/298.7 |
| 2017/0362427 | A1* | 12/2017 | Furukawa .................. | C08J 5/04 |
| 2020/0048413 | A1 | 2/2020 | Asano | |

FOREIGN PATENT DOCUMENTS

| | | | |
|---|---|---|---|
| JP | 01104624 | A | 4/1989 |
| JP | 2005298815 | A | 10/2005 |
| JP | 2006291093 | A | 10/2006 |
| JP | 2009263550 | A | 11/2009 |
| JP | 2010202727 | A | 9/2010 |
| JP | 2014145017 | A | 8/2014 |
| JP | 2017197665 | A | 11/2017 |
| WO | 03040206 | A1 | 5/2003 |
| WO | 2006095516 | A1 | 9/2006 |
| WO | 2012124450 | A1 | 9/2012 |
| WO | 2013100024 | A1 | 7/2013 |
| WO | 2014017340 | A1 | 1/2014 |
| WO | 2018207728 | A1 | 11/2018 |

OTHER PUBLICATIONS

Partial machine translation of JP 2006-291093 A (Year: 2006).*
International Search Report and Written Opinion for International Application No. PCT/JP2020/046004, dated Mar. 16, 2021, 6 pages.

* cited by examiner

*Primary Examiner* — Kregg T Brooks
(74) *Attorney, Agent, or Firm* — Buchanan Ingersoll & Rooney PC

(57) ABSTRACT

The present invention addresses the problem of providing a prepreg that yields a carbon fiber composite material that has exceptional tensile strength, heat resistance, and impact resistance and is suitable as a structural material of an aircraft body, wherein the resin composition used in the prepreg furthermore has exceptional viscosity stability, the prepreg containing a resin composition that contains carbon fibers and at least the constituent elements [A]-[D] as defined.

10 Claims, No Drawings

PREPREG

CROSS REFERENCE TO RELATED APPLICATIONS

This is the U.S. National Phase application of PCT/JP2020/046004, filed Dec. 10, 2020, which claims priority to Japanese Patent Application No. 2019-235865, filed Dec. 26, 2019 and Japanese Patent Application No. 2020-043995, filed Mar. 13, 2020, the disclosures of these applications being incorporated herein by reference in their entireties for all purposes.

FIELD OF THE INVENTION

The present invention relates to a prepreg intended for the production of a carbon fiber reinforced plastic having high tensile strength, high heat resistance, and high impact resistance and characterized by containing a resin composition having high viscosity stability.

BACKGROUND OF THE INVENTION

High in heat resistance and corrosion resistance as well as mechanical properties such as strength and rigidity, in spite of being light in weight, fiber reinforced composite materials, which consist mainly of reinforcing fiber and matrix resin, have been used conventionally in a wide variety of fields including aviation/aerospace, automobiles, railway vehicles, ships, civil engineering, construction, and sports goods. In applications requiring high heat resistance, in particular, fiber reinforced composite materials incorporating continuous reinforcing fibers are used, and carbon fibers, which are generally high in specific strength and specific modulus, are adopted as reinforcing fiber. As the matrix resin, thermosetting resins are generally used and in particular, epoxy resins are adopted frequently because of high adhesiveness to carbon fibers, high heat resistance, high elastic modulus, and small cure shrinkage. In recent years, carbon fiber reinforced plastics (hereinafter abbreviated as CFRPs) are in wider use, and accordingly, they are now required to meet more rigorous requirements.

When applied to structural members such as for aerospace applications and vehicles, in particular, their materials are required to maintain necessary physical properties under high temperature conditions. To develop materials that can show good physical properties under high temperature conditions, it is necessary to develop epoxy resins with improved heat resistance to serve as matrix resin, and the improvement in heat resistance of an epoxy resin requires an increase in crosslink density.

However, an increase in crosslink density tends to lead to a decrease in the elongation percentage of the epoxy resin. For CFRPs, it is known that a decrease in tensile elongation at break of the matrix resin causes a decrease in the tensile strength utilization rate of the matrix resin, and as a result, CFRPs may fail to fully display their high specific strength, which is one of their characteristic features. Under the above circumstances, various epoxy resin modification techniques have been proposed for the purpose of providing CFRPs that have both high heat resistance and strength.

To improve heat resistance by decreasing the crosslink density of the epoxy resin, a conceivable method is to introduce a rigid structure that works to reduce the degree of freedom of the molecular chain in the backbone of the epoxy resin, for which it is effective to use a compound having an aromatic rigid skeleton. For example, Patent document 1 proposes a resin composition that contains an epoxy resin having a naphthalene skeleton as such a rigid skeleton, but the resin composition is intended for electronic substrates and fails to have mechanical properties, hot-wet resistance, etc. that are properly designed for structural materials. Patent document 2, furthermore, proposes the use of tri- or more functional bis-naphthalene type epoxy resins for structural materials, but they fail to have sufficiently decreased crosslink densities. Compared with this, Patent document 3 proposes the use of an epoxy resin having a dicyclopentadiene skeleton, but it has the disadvantage of low heat resistance.

PATENT DOCUMENTS

Patent document 1: Japanese Unexamined Patent Publication (Kokai) No. 2009-263550

Patent document 2: Japanese Unexamined Patent Publication (Kokai) No. 2014-145017

Patent document 3: Japanese Unexamined Patent Publication (Kokai) No. 2010-202727

SUMMARY OF THE INVENTION

In view of such background technology, the present invention mainly aims to provide a prepreg that is intended for the production of a carbon fiber reinforced plastic high in tensile strength, heat resistance, and impact resistance and suitable as structural material for airframe and is characterized by containing a resin composition having high viscosity stability.

The present invention adopts the following means to solve such problems. Specifically, it provides a prepreg including carbon fiber and a resin composition containing at least the components [A] to [D] specified below, wherein the epoxy resin of the component [A] contains [A1] and [A2], the [A1] having an epoxy equivalent of 200 g/eq or more and 265 g/eq or less and accounting for 5 parts by mass or more and 45 parts by mass or less, the [A2] accounting for 55 parts by mass or more and 95 parts by mass or less, the [A2] including at least [A2-1] and [A2-2], the mass ratio of [A2-1]/[A2-2] being 0.7 or more and 4.0 or less, and the resin composition showing a viscosity increase rate of 20% or less when maintained at 80° C. for 2 hours:

[A]: an epoxy resin containing [A1] and [A2],

[A1]: dicyclopentadiene type epoxy resin,

[A2]: an epoxy resin containing [A2-1] and [A2-2],

[A2-1]: a tetrafunctional liquid type epoxy resin,

[A2-2]: a bifunctional liquid type epoxy resin,

[B]: diaminodiphenyl sulfone,

[C]: polyethersulfone, and

[D]: perfect spherical polymer particles.

It also provides a prepreg including the component [E] specified below impregnated with a resin composition containing the components [A] to [D-2], wherein the [A1], i.e. a dicyclopentadiene type epoxy resin having an epoxy equivalent of 200 g/eq or more and 265 g/eq or less, accounts for 45 parts by mass or more and 80 parts by mass or less and the [A2-1], i.e. a tetrafunctional liquid type epoxy resin, accounts for 10 parts by mass or more and 40 parts by mass or less in 100 parts by mass of the component [A]:

[A] an epoxy resin,

[B] diaminodiphenyl sulfone,

[C] polyethersulfone,

[D-2] thermoplastic resin particles, and

[E] carbon fiber.

It also provides a prepreg including carbon fiber and at least the components [A] to [D] specified below, wherein the epoxy resin of the component [A] contains 2 parts by mass or more and 15 parts by mass or less of the [A1], 45 parts by mass or more and 65 parts by mass or less of the [A2-1], 15 parts by mass or more and 35 parts by mass or less of the [A3], and 0 part by mass or more and 35 parts by mass or less of the [A4], relative to the total quantity, i.e. 100 parts by mass, of the epoxy resin, and the [A1] has an epoxy equivalent of 200 g/eq or more and 265 g/eq or less.

[A]: an epoxy resin containing [A1], [A2-1], [A3], and [A4],
[A1]: a dicyclopentadiene type epoxy resin,
[A2-1]: a tetrafunctional liquid type epoxy resin,
[A3]: a bifunctional glycidyl aniline type epoxy resin,
[A4]: an epoxy resin other than [A1], [A2-1], and [A3],
[B]: diaminodiphenyl sulfone,
[C]: polyethersulfone, and
[D]: perfect spherical polymer particles.

The present invention provides a prepreg that serves as an intermediate base material for producing CFRPs having high tensile strength, heat resistance, and impact resistance. In addition, the resin composition maintains a high viscosity stability during the prepreg production process, and the prepreg also serves to produce prepreg tapes that can be stacked efficiently by the automated tape lay-up method.

DETAILED DESCRIPTION OF EMBODIMENTS OF THE INVENTION

The present invention will be described more in detail below.

The present invention discloses three types of prepregs that include dicyclopentadiene type epoxy resins. The first of the prepregs includes carbon fiber and a resin composition containing at least the components [A] to [D] specified below, wherein the epoxy resin of the component [A] contains [A1] and [A2], the [A1] having an epoxy equivalent of 200 g/eq or more and 265 g/eq or less and accounting for 5 parts by mass or more and 45 parts by mass or less, the [A2] accounting for 55 parts by mass or more and 95 parts by mass or less, the [A2] including at least [A2-1] and [A2-2], the mass ratio of [A2-1]/[A2-2] being 0.7 or more and 4.0 or less, and the resin composition showing a viscosity increase rate of 20% or less when maintained at 80° C. for 2 hours:

[A]: an epoxy resin containing [A1] and [A2],
[A1]: a dicyclopentadiene type epoxy resin,
[A2]: an epoxy resin containing [A2-1] and [A2-2],
[A2-1]: a tetrafunctional liquid type epoxy resin,
[A2-2]: a bifunctional liquid type epoxy resin,
[B]: diaminodiphenyl sulfone,
[C]: polyethersulfone, and
[D]: perfect spherical polymer particles.

Hereinafter, the resin composition containing at least the components [A] to [D] will be occasionally referred to simply as the resin composition.

For the present invention, the component [A] is an epoxy resin and acts as the basis for developing good mechanical properties of the resulting CFRP and high handleability of the prepreg. Such any epoxy resin used for the present invention is a compound having one or more epoxy groups in one molecule.

The dicyclopentadiene type epoxy resin of the component [A1] used for the present invention is an epoxy resin containing a single component or an epoxy resin mixture containing multiple components each having a dicyclopentadiene skeleton as represented by the structural formula (1) given below.

[Chemical compound 1]

(1)

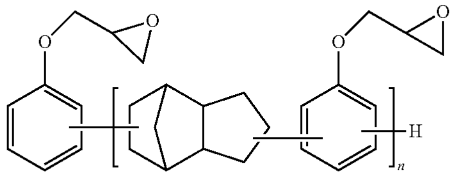

In the structural formula (1), which represents the structure contained in the dicyclopentadiene type epoxy resin of the component [A1], n is preferably an integer of 1 to 6 although it is not particularly limited as long as the molecule has an epoxy equivalent as specified later. Additionally, the molecule with an n of 0 may be included as an impurity.

The use of a dicyclopentadiene type epoxy resin having an epoxy equivalent of 200 g/eq or more and 265 g/eq or less as the component [A1] used for the present invention serves to produce a cured resin composition having both a low crosslink density and a high heat resistance. This is considered to be a contribution of the fact that the dicyclopentadiene has a rigid skeleton.

For the present invention, furthermore, mechanical characteristics such as tensile strength can be improved if the dicyclopentadiene type epoxy resin used as the component [A1] accounts for 5 parts by mass or more and 45 parts by mass or less relative to 100 parts by mass of the epoxy resin of the component [A]. The upper limit of the dicyclopentadiene type epoxy resin used as the component [A1] is preferably 45 parts by mass or less relative to 100 parts by mass of the epoxy resin of the component [A].

The dicyclopentadiene type epoxy resin of the component [A1] preferably accounts for 25 parts by mass or more because it serves to produce a CFRP not only having an improved tensile strength but also realizing a good balance among mode-I interlaminar toughness ($G_{IC}$), impact resistance, and heat resistance. Furthermore, if the dicyclopentadiene type epoxy resin of the component [A1] has an epoxy equivalent of 265 g/eq or less, its compatibility with the polyethersulfone (hereinafter abbreviated as PES) of the component [C] used in combination therewith will be improved, which allows the content of the dicyclopentadiene type epoxy resin of the component [A1] to be increased easily and serves advantageously in improving the mechanical characteristics as described above. It is preferable for the dicyclopentadiene type epoxy resin to have an epoxy equivalent of 253 g/eq or less. On the other hand, if the dicyclopentadiene type epoxy resin has an epoxy equivalent of 200 g/eq or more, it serves to produce a cured product having an improved heat resistance.

Commercial products of dicyclopentadiene type epoxy resin useful as the component [A1] for the present invention include EPICLON HP-7200 L (epoxy equivalent 245 g/eq to 252 g/eq, softening point 50° C. to 60° C.), EPICLON HP-7200 (epoxy equivalent 254 g/eq to 264 g/eq, softening point 56° C. to 58° C.) (both manufactured by DIC Corporation), XD-1000-L (epoxy equivalent 240 g/eq to 255 g/eq, softening point 60° C. to 70° C.), XD-1000-2 L (epoxy equivalent 235 g/eq to 250 g/eq, softening point 53° C. to 63° C.) (both manufactured by Nippon Kayaku Co., Ltd.), and Tactix 556 (epoxy equivalent 215 g/eq to 235 g/eq, softening point 79° C.) (manufactured by Huntsman).

The component [A2] used for the present invention contains a tetrafunctional liquid type epoxy resin as [A2-1] and a bifunctional liquid type epoxy resin as [A2-2]. If the component [A2] accounts for 55 parts by mass or more and 95 parts by mass or less relative to 100 parts by mass of the epoxy resin of the component [A], it serves to realize a good balance between mechanical characteristics of the CFRP produced by molding the prepreg according to the present invention and the handleability of the prepreg.

The tetrafunctional liquid epoxy resin of the [A2-1] has four or more epoxy groups in one molecule of the epoxy resin and is in a liquid state at 23° C., and typically it is glycidyl amine type epoxy resin. Examples include tetraglycidyl diaminodiphenyl methane as well as halogen-substituted products, alkyl-substituted products, aralkyl-substituted products, and hydrogenated products thereof. Commercial products thereof include Sumiepoxy ELM434 (manufactured by Sumitomo Chemical Co., Ltd.), Araldite MY720, Araldite MY721, Araldite MY9512, Araldite MY9663 (all manufactured by Huntsman Advanced Materials), and Epotohto YH-434 (manufactured by Tohto Kasei Co., Ltd.).

The bifunctional liquid epoxy resin of the [A2-2] is an epoxy resin having two epoxy groups in one molecule and is in a liquid state at 23° C., and useful examples thereof include bisphenol A type epoxy resin, bisphenol F type epoxy resin, and glycidyl aniline type epoxy resin. Commercial products of glycidyl aniline type epoxy resin include GAN (N,N-diglycidylaniline) (manufactured by Nippon Kayaku Co., Ltd.) and GOT (N,N-diglycidyl-o-toluidine) (manufactured by Nippon Kayaku Co., Ltd.).

In regard to the mass ratio between the [A2-1] and the [A2-2], a good balance between the heat resistance and mechanical characteristics such as tensile strength of CFRPs can be realized if the [A2-1]/[A2-2] ratio is 0.7 or more and 4.0 or less. The [A2-1]/[A2-2] ratio is preferably 2.0 or more and 4.0 or less when heat resistance is more important whereas the [A2-1]/[A2-2] ratio is preferably 0.7 or more and less than 2.0 when tensile strength is more important. It is preferable that the [A2-1]/[A2-2] ratio be 0.7 or more and less than 2.0 because it serves to decrease the storage elastic modulus G' of the resin composition at room temperature, making it easy to produce a prepreg having increased shape followability, that is, higher softness, at room temperature. In particular, it is preferable to use a glycidyl aniline type epoxy resin because it serves to produce a prepreg having increased softness at room temperature and also to produce CFRPs having increased tensile strength, and in that case, the heat resistance can also be increased by raising the [A2-1]/[A2-2] ratio to 2.0 or more.

Needless to say, for the epoxy resin composition used for the present invention, the epoxy resin used as the component [A] may contain an epoxy resin component other than the components [A1] and [A2].

For the present invention, diaminodiphenyl sulfone (hereinafter abbreviated as DDS) is adopted as the component [B]. DDS is used to act as a curing agent for the epoxy resin of the component [A]. Examples of DDS include 4,4'-diaminodiphenyl sulfone (4,4'-DDS) and 3,3'-diaminodiphenyl sulfone (3,3'-DDS). With a lower reaction activity than 3,3'-DDS, 4,4'-DDS can work to improve the stability of the resin composition during the prepreg production process. On the other hand, 3,3'-DDS serves to produce a cured product having improved elastic modulus and accordingly provide a CFRP with increased elastic modulus and compression strength.

For the present invention, the content of the DDS used as the component [B] can be represented by the ratio of the total number of active hydrogen atoms ($H_B$) in the DDS to the total number of epoxy groups (E) in the epoxy resin of the component [A], namely, $H_B$/E. The $H_B$/E ratio is preferably 0.7 or more because it ensures a sufficient degree of curing and serves to produce a cured product having high heat resistance. On the other hand, the $H_B$/E ratio is preferably 1.3 or less, because it serves to reduce the unreacted amount of the curing agent and improve the heat resistance. Focusing on, as an example, an epoxy resin component [A] consisting of 40 parts by mass of HP-7200 L as the component [A1], 30 parts by mass of ELM-434 as the component [A2], and 30 parts by mass of EPICLON 830 as an epoxy resin other than the components [A1] and [A2], its cured resin product will have a glass transition temperature of about 185° C. when the DDS content, i.e. $H_B$/E, is adjusted to 0.7, a glass transition temperature of about 190° C. when $H_B$/E is adjusted to 1.0, and a glass transition temperature of about 185° C. when $H_B$/E is adjusted to 1.3. When the DDS content $H_B$/E is adjusted to 0.6, on the other hand, its cured resin product will be brittle and fail to form a uniform resin plate, and the adoption of a $H_B$/E of 1.4 will lead to a glass transition temperature of less than 170° C. and a low heat resistance.

For the present invention, a curing agent used may contain a component other than DDS. For example, a hydrazide based curing agent can be cited as an auxiliary curing agent that shortens the curing time of a resin composition, and in particular, the use of isophthalic acid dihydrazide (hereinafter abbreviated as IDH) is preferable because it has a preferred reaction starting temperature for the molding of prepregs for structural materials. Since IDH starts to react with the epoxy group at a lower temperature than DDS, it serves to shorten the curing time and increase the CFRP production efficiency. Here, the content of IDH can be represented by the ratio between the total number of active hydrogen atoms ($H_F$) in the IDH and the total number of epoxy groups (E) in the epoxy resin component [A], namely, $H_F$/E. The $H_F$/E ratio is preferably 0.05 or more because it serves to shorten the curing time. On the other hand, it is preferable to adjust the $H_F$/E ratio to 0.3 or less because it serves to realize a good balance between the curing time shortening effect and heat resistance. In addition, the addition of IDH also acts to shorten the time required to start the gelation of the resin composition in the curing step. Therefore, the flow of the resin being cured can be controlled by adding IDH with the aim of obtaining a CFRP with improved quality. Commercially available hydrazide based curing agents include, for example, IDH-S (manufactured by Otsuka Chemical Co., Ltd.).

For the present invention, a curing accelerator may be added unless it impairs the heat resistance and thermal stability of the resin composition. Examples of such a curing accelerator include tertiary amines, Lewis complexes, onium salts, imidazole compounds, urea compounds, hydrazide compounds, and sulfonium salts. The content of the curing accelerator has to be adjusted appropriately according to the type used, but it is preferably 10 parts by mass or less and more preferably 5 parts by mass or less, relative to the total quantity, i.e. 100 parts by mass, of the epoxy resin. A curing accelerator content controlled in this range is preferable because an uneven temperature distribution will not occur easily during the molding of a CFRP.

For the present invention, polyether sulfone (hereinafter occasionally referred to as PES) is used as the component [C]. PES has an ether bond and a sulfone bond in the backbone and is used with the aim of controlling the tackiness property of the resulting prepreg, controlling the fluidity of the matrix resin during the heat curing of the prepreg, and producing a CFRP without impairing its heat resistance, elastic modulus, etc. while imparting high tensile strength, impact resistance, and mode I interlaminar toughness ($G_{IC}$). It is preferable for the PES used to have a weight average molecular weight of 10,000 g/mol or more because it allows a CFRP having improved mechanical properties such as tensile strength, mode-I interlaminar toughness, and impact resistance to be produced by molding the prepreg according to the present invention. Here, the weight average molecular weight referred to herein means a weight average molecular weight measured by gel permeation chromatography (hereinafter abbreviated as GPC) and converted in terms of polystyrene. On the other hand, it is preferable for the PES to have a weight average molecular weight of 30,000 g/mol or less because such a PES is high in compatibility with the dicyclopentadiene type epoxy resin used as an important component of the present invention and serves to ensure high process stability in the resin composition preparation step, resin film formation step, and prepreg formation step. In addition, if the weight average molecular weight is adjusted to 30,000 g/mol or less, it allows the contents of the dicyclopentadiene type epoxy resin and PES to be increased. The expression "PES is compatible with the dicyclopentadiene type epoxy resin" as used herein means that they form a uniform phase when PES is mixed with the epoxy resin and heated while stirring. The expression "form a uniform phase" means that there occurs a state where phase separation is not found by visual observation. Furthermore, an increase in the compatibility serves to suppress the formation of a phase separated structure between the epoxy resin and PES during the curing step, and a CFRP of constant quality can be obtained regardless of the curing conditions. Furthermore, the range of curing conditions that can be adopted is widened, and structural differences among different portions can be suppressed even when a thick material is being molded, thereby ensuring improvement in quality stability.

It is preferable for the PES to account for 2 parts by mass or more relative to 100 parts by mass of the epoxy resin used as the component [A] because it serves to produce a CFRP having enhanced mechanical properties such as tensile strength, impact resistance, and mode-I interlaminar toughness. On the other hand, it is preferable for the PES to account for 18 parts by mass or less because it serves to prepare an epoxy resin composition with higher viscosity and ensure high process stability in the resin composition preparation step, resin film formation step, and prepreg formation step. It is also preferable from the viewpoint of handleability properties, such as tackiness, of the prepreg. In addition, if the PES content is 2 parts by mass or more and 18 parts by mass or less, a higher content in this range leads to a CFRP that is higher in tensile strength, impact resistance, and mode-I interlaminar toughness.

Commercial products of PES that can serve as the component [C] for the present invention include Virantage VW-10700RFP (weight average molecular weight 21,000 g/mol) and Virantage VW-10200RFP (weight average molecular weight 46,500 g/mol) (both manufactured by Solvay Advanced Polymers) and also include Sumikaexcel PES5003P (manufactured by Sumitomo Chemical Co., Ltd.), which has a weight average molecular weight close to that of Virantage VW-10200 RFP.

The component [D] used for the present invention is perfect spherical polymer particles. The inclusion of perfect spherical polymer particles serves to produce a CFRP having increased impact resistance in particular. There are no particular limitations on the polymer to adopt for the perfect spherical polymer particles used for the present invention as long as the preferred effects of the present invention can be realized, but preferable examples include polyamide, polyether sulfone, polyetherimide, polyamideimide, polyimide, and polyphenylene ether for the purpose of producing CFRPs for structural members that develop stable adhesive strength and impact resistance while maintaining high hot-wet resistance and chemical resistance and also in consideration of the fact that it may be applied to general prepreg molding processes (in which the temperature may be as high as 180° C.). Among other polyamides, more preferable ones include polyamide 12, polyamide 11, polyamide 6, polyamide 66, polyamide 6/12 copolymer, and a polyamide modified into a semi-IPN (interpenetrating polymer network) structure (semi-IPN polyamide) as described in Example 1 of Japanese Unexamined Patent Publication (Kokai) No. H01-104624.

The use of polymer particles that have a perfect spherical shape serves to produce CFRPs having high impact resistance. Perfect spherical particles as referred to for the present invention have a sphericity, which is defined below, in the range of 90 to 100. Sphericity is determined by observation of 30 particles selected at random in a scanning electron micrograph and calculation from their major axis and minor axis by the following formula.

$$S = \sum_{i=1}^{n} (b/a)/n \times 100$$ [Mathematical formula 1]

Here, S is the sphericity; a is the major axis; b is the minor axis; and n is the number of measurements, which is 30.

To cite commercial products of perfect spherical polymer particles, there are polyamide based ones including SP-500 and SP-10 (manufactured by Toray Industries, Inc.), polymethyl methacrylate based ones including MBX series such as MBX-12 and SSX series such as SSX-115 (manufactured by Sekisui Plastics Co., Ltd.), polystyrene based ones including SBX series such as SBX-12 (manufactured by Sekisui Plastics Co., Ltd.), copolymers thereof including MSX and SMX (manufactured by Sekisui Plastics Co., Ltd.), polyurethane based ones including Daimic Beads CM series, cellulose acetate based ones including BELLOCEA (manufactured by Daicel Corporation), and phenol resin based ones including Marilin (manufactured by Gunei Chemical Industry Co., Ltd.). In addition, examples of perfect spherical particles of polyamide or a copolymer thereof include polyamide based particles as described in Example 1 of Japanese Unexamined Patent Publication (Kokai) No. H01-104624 and polyamide based particles as described in WO2018/207728. Furthermore, there are polyethersulfone based perfect spherical particles including, for example, those described in Japanese Unexamined Patent Publication (Kokai) No. 2017-197665. In particular, the polyamide based particles described in Example 1 of Japanese Unexamined Patent Publication (Kokai) No. H01-104624 are still more preferable because they are high in hot-wet resistance, chemical resistance, etc. and serve to produce CFRPs having impact resistance. It is preferable for these perfect spherical polymer particles to have a diameter of 5 μm or more and 45 μm or less as mode diameter determined by the light scattering method. If it is in this range, it serves to produce CFRPs having stable impact resistance. Their particle diameter can be measured by the light scattering method using, for example, Partica LA-950V2 manufactured by Horiba, Ltd. or MT3300II manufactured by Microtrac.

Since the resin composition according to the present invention shows a viscosity increase rate of 20% or less when maintained at 80° C. for 2 hours, the resin composition is high in viscosity stability in the prepreg production process, particularly in the step for processing the resin composition into a film, and it can also serve to provide a resin composition film that is high in areal weight stability, uniformity, and process stability. The viscosity increase rate is more preferably 10% or less. To decrease the viscosity increase rate during a 2 hour period maintained at 80° C., a preferable method is to reduce the reactivity of the resin composition at 80° C., and from this point of view, the DDS used as the curing agent is preferably 4,4'-DDS rather than 3,3'-DDS. In consideration of this in relation with the epoxy resin used for the present invention, a bifunctional liquid type epoxy resin, rather than a triglycidylaminophenol type epoxy resin, which is highly reactive, is adopted to serve as the epoxy resin to be combined with a dicyclopentadiene type epoxy resin and a tetrafunctional epoxy resin, and in particular, it is preferable to adopt a bisphenol type epoxy resin.

A prepreg of the present second invention that is called as the second prepreg that includes the component [E] specified below impregnated with a resin composition containing the components [A] to [D-2], wherein the [A1], i.e. a dicyclopentadiene type epoxy resin having an epoxy equivalent of 200 g/eq or more and 265 g/eq or less, accounts for 45 parts by mass or more and 80 parts by mass or less and the [A2-1], i.e. a tetrafunctional liquid type epoxy resin, accounts for 10 parts by mass or more and 40 parts by mass or less in 100 parts by mass of the component [A]:

[A] an epoxy resin,
[B] diaminodiphenyl sulfone,
[C] polyethersulfone,
[D-2] thermoplastic resin particles, and
[E] carbon fiber.

Thus, the second prepreg according to the present invention preferably includes the component [E] specified below impregnated with an epoxy resin composition containing the components [A] to [D-2], wherein the [A1], i.e. a dicyclopentadiene type epoxy resin having an epoxy equivalent of 200 g/eq or more and 265 g/eq or less, accounts for 45 parts by mass or more and 80 parts by mass or less and the [A2-1], i.e. a tetrafunctional liquid type epoxy resin, accounts for 10 parts by mass or more and 40 parts by mass or less in 100 parts by mass of the component [A]:

[A] an epoxy resin,
[B] diaminodiphenyl sulfone,
[C] polyethersulfone,
[D-2] thermoplastic resin particles, and
[E] carbon fiber.

The second prepreg is characterized in that the content of the dicyclopentadiene type epoxy resin is as large as 45 parts by mass or more and 80 parts by mass or less. This makes it possible to improve mechanical properties in a low temperature environment such as tensile strength at −60° C. It is preferable for the dicyclopentadiene type epoxy resin to account for 45 parts by mass or more and 60 parts by mass or less because it serves to produce CFRPs having a good balance among tensile strength, mode-I interlaminar toughness ($G_{IC}$), and heat resistance. From this point of view, furthermore, it is also preferable for the dicyclopentadiene type epoxy resin to account for 22 mass % or more and 55 mass % or less of the total mass of the resin composition. The epoxy equivalent of the dicyclopentadiene type epoxy resin can be set appropriately as in the case of the first aspect of the present invention.

A tetrafunctional liquid type epoxy resin is used as the component [A2-1] for the second prepreg, and a compound as used as the [A2-1] for the first prepreg is adopted. Its content is 10 parts by mass or more and 40 parts by mass or less, preferably 10 parts by mass or more and 30 parts by mass or less, in 100 parts by mass of the epoxy component [A]. If the content of the component [A2-1] is in this range, it serves to produce CFRPs having a good balance between heat resistance and tensile strength.

Furthermore, for the resin composition used for the second prepreg, the epoxy resin component [A] may contain an epoxy resin other than the components [A1] and [A2-1], and, although such an epoxy resin is not particularly limited, useful examples include bisphenol A type epoxy resin, bisphenol F type epoxy resin, aminophenol type epoxy resin, and glycidyl aniline type epoxy resin.

For the other components [B] and [C] used for the second prepreg, the same compounds as for the first prepreg are used. The addition of the thermoplastic polymer particles of the component [D-2] serves to produce CFRPs having increased mode-II interlaminar toughness and increased impact resistance in particular. There are no particular limitations on the thermoplastic polymer to be used for the thermoplastic polymer particles for the present invention as long as the preferred effects of the present invention can be realized, but from the viewpoint of providing CFRPs having stable adhesive strength and impact resistance, it is preferable for them to be particles that can retain their shapes in the resin composition. In particular, preferable ones include polyamide, polyetherimide, polyamideimide, and polyphenylene ether. Examples of polyamides that can be used suitably include polyamide 12, polyamide 11, polyamide 6, polyamide 66, polyamide 6/12 copolymer, and a polyamide modified with an epoxy compound into a semi-IPN (interpenetrating polymer network) structure (semi-IPN polyamide) as described in Example 1 of Japanese Unexamined Patent Publication (Kokai) No. H01-104624. In regard to the shape of the thermoplastic polymer particles, they may be spherical particles, non-spherical particles, or porous particles, of which spherical particles are preferred because they work to maintain flow properties of the resin to ensure high viscoelasticity and also because they are free of starting points of stress concentrations to ensure high impact resistance. In particular, when perfect spherical polymer particles are used, the same particles as used in the first prepreg can be adopted. Although not perfect spherical, useful particle products include Orgasol® 1002D, 2001UD, 2001EXD, 2002D, 3202D, 3501 D, and 3502D (all manufactured by Arkema K.K.), Grilamide® TR90 (manufactured by Emser Werke, Inc.), and TROGAMID® CX7323, CX9701, and CX9704 (manufactured by Degussa AG). These thermoplastic resin particle materials may be used singly, or a plurality thereof may be used in combination. Commercial products of polyetherimide include Ultem® 1000, Ultem® 1010, and Ultem® 1040 (all manufactured by Solvay Advanced Polymers).

By molding the second prepreg, it is possible to produce a CFRP that is high in tensile strength property, heat resistance, and mode-I interlaminar toughness both in a room temperature environment and in a low temperature environment.

Such tensile strength property can be evaluated in terms of 0° tensile strength measurement. In regard to the angle 0° for CFRPs, as described in JIS K7017(1999), the fiber direction of a unidirectional fiber reinforced composite material is defined as its axis direction and this direction is defined as the 0° direction whereas the direction perpendicular to the axis is defined as the 90° direction. A 0° tensile test is conducted according to the standard of JIS K7073 (1988) under two measuring temperature conditions, i.e. room temperature (23° C.) and a low temperature (−60° C.), and the strength retention rate, i.e. the ratio between the tensile strength in the room temperature environment and the tensile strength in the low temperature environment, is calculated by the formula given below.

Strength retention rate (%)=tensile strength(in low temperature environment)/tensile strength(in room temperature environment)×100

For the tensile strength of a CFRP produced from the second prepreg, the strength retention rate is preferably 90% or more and 110% or less and more preferably 95% or more and 110% or less. If the strength retention rate is adjusted within this range, the difference in strength will be small between the low temperature (−60° C.) environment, i.e. the operating environment of airframe, and the environment around room temperature, and good mechanical properties will be maintained at low temperatures.

The mode-I interlaminar toughness ($G_{IC}$) can be determined according to JIS K7086 (1993), and the $G_{IC}$ is preferably 350 J/m$^2$ or more because CFRPs with such values can be applied to wider structural members for airframe.

The present invention provides a third prepreg that is characterized by including a combination of a dicyclopentadiene type epoxy resin as the component [A1] and a bifunctional glycidyl aniline type epoxy resin as the component [A3]. The dicyclopentadiene type epoxy resin may be the same as that used for the first or second prepreg. As described above, the use of a dicyclopentadiene type epoxy resin is advantageous in producing CFRPs having high tensile strength, but on the other hand, many resins of this species are so-called solid epoxy resins having softening points of 50° C. or more, placing limits to the control of viscoelasticity of the relevant resin compositions or prepregs around room temperature. More specifically, in the automated prepreg tape lay-up process, which has become very popular in recent years as will be described later, the use of a resin composition with excessively high storage elastic modulus (G') can easily cause problems in some cases such as defective splicing of prepreg tapes, defective conveyance and coming-off of tapes from splicers on the conveyance path in the automated lay-up machine, and defective lay-up. The inclusion of a solid epoxy resin can lead to a resin composition having a large G' value around room temperature. To solve these problems, a bifunctional glycidyl aniline type epoxy resin is used in combination so that CFRPs having high tensile strength can be produced even if the amount of the dicyclopentadiene type epoxy resin is decreased. In addition, many bifunctional glycidyl aniline type epoxy resins are liquid around room temperature and are suitable when viscoelasticity control around room temperature is required. Commercial products of bifunctional glycidyl aniline type epoxy resin include GAN (N,N-diglycidyl aniline) (manufactured by Nippon Kayaku Co., Ltd.) and GOT (N,N-diglycidyl-o-toluidine) (manufactured by Nippon Kayaku Co., Ltd.).

The use of a combination of 2 parts by mass or more and 15 parts by mass or less of dicyclopentadiene type epoxy resin and 15 parts by mass or more and 35 parts by mass or less of bifunctional glycidyl aniline type epoxy resin serves for both producing a CFRP having high strength and adjusting the viscoelasticity appropriately around room temperature. It is preferable for the dicyclopentadiene type epoxy resin to account for 5 parts by mass or more and 10 parts by mass or less because it serves to realize a good balance between preparing a resin composition with a decreased G' value around room temperature and producing a CFRP with high strength. In addition, it is preferable for the bifunctional glycidyl aniline type epoxy resin to account for 20 parts by mass or more because it serves for easy production of a CFRP with a higher tensile strength. Here, a preferable number of parts by mass of each epoxy resin may be set relative to the total amount, which is assumed to account for 100 parts by mass, of the epoxy resins contained in the first resin composition and the second resin composition.

In addition, the tetrafunctional liquid type epoxy resin of the component [A2-1] used here may be the same as that used as the [A2-1] for the first or second prepreg. If its content is 45 parts by mass or more and 65 parts by mass or less, it serves to produce a CFRP having a good balance between heat resistance and tensile strength. The content of the tetrafunctional liquid type epoxy resin is more preferably 50 parts by mass or more and 60 parts by mass or less.

The third prepreg may further include an epoxy resin component [A4] other than the [A1], [A2-1], and [A3]. If an appropriate resin is selected as the [A4], it serves to prepare a resin composition having a properly adjusted viscoelasticity and ensure a favorable processability in the resin composition and prepreg preparation steps and the prepreg molding steps. Useful resins for the [A4] include bisphenol A type epoxy resin, bisphenol F type epoxy resin, and aminophenol type epoxy resin. Its content is 0 part by mass or more and 35 parts by mass or less.

For the other components of [B], [C], and [D] adopted for the third prepreg, too, the same materials as those for the first or second prepreg may be used.

Described below are other features of the present invention.

Useful carbon fibers include acrylic, pitch based, and rayon based carbon fibers, of which acrylic carbon fiber can be used suitably because it is high in tensile strength.

Such an acrylic carbon fiber can be produced through, for example, a process as described below. A spinning dope solution that contains polyacrylonitrile produced from monomers incorporating acrylonitrile as primary component is spun by wet spinning, dry-wet spinning, dry spinning, or melt spinning. To produce carbon fiber, coagulated threads formed by spinning are subjected to a yarn-making step to provide a precursor, which is then subjected to subsequent steps such as flameproofing and carbonization.

There are no particular limitations on the form and alignment of carbon fibers in a prepreg according to the present invention, and the carbon fiber to be used may have such a fiber structure as continuous fibers paralleled in one direction, single tow, woven fabric (plain weave, satin weave, twill weave), knit fabric, nonwoven fabric, mat, and braid. Among others, it is preferable to use fibers paralleled and aligned in one direction or in the form of woven fabric of plain weave, satin weave, or twill weave, and it is particular preferable to use such carbon fibers in the form of layers thereof. Here, continuous fibers refer to those with an average length of 10 mm.

In addition, two or more types of carbon fiber may be used together, or carbon fiber may be combined with other reinforcing fibers such as glass fiber, aramid fiber, boron fiber, PBO fiber, high strength polyethylene fiber, alumina fiber, and silicon carbide fiber.

For the present invention, it is preferable to use carbon fiber having a tensile elastic modulus in the range of 200 to 440 GPa. It is preferably in this range because it serves to produce a CFRP having a high-level balance between rigidity and strength. The elastic modulus is more preferably in the range of 230 to 400 GPa and still more preferably in the range of 250 to 370 GPa.

It is preferable to use a carbon fiber having a tensile elongation of 0.8% to 3.0%. A carbon fiber having a low tensile elongation may occasionally fail to produce a CFRP having a sufficiently high tensile strength and impact resistance. Furthermore, carbon fiber having a tensile elongation of more than 3.0% tends to decrease in tensile elastic modulus. It is more preferable to use a carbon fiber to have a tensile elongation of 1.0% to 2.5%, still more preferably 1.2% to 2.3%.

Here, the tensile elastic modulus and tensile elongation of a carbon fiber are measured according to JIS R7601 (2006).

The carbon fiber to be used for the present invention preferably contains 1,000 to 50,000 filaments per fiber bundle. If the number of filaments is less than 2,500, the aligned fiber filaments may be easily meandered, leading to a decrease in strength, and therefore, the number of filaments is more preferably in the range of 2,500 to 40,000, which is particularly suitable for the aerospace industry.

Good commercial carbon fiber products include Torayca® T800S-24K, Torayca® T800G-24K, Torayca® T1100G-24K, Torayca® Cloth CO6343 (carbon fiber: T300-3K), and Torayca® Cloth CK6244C (carbon fiber: T700S-12K).

The resin composition to be used for the prepreg according to the present invention may contain, for example, a coupling agent, inorganic fillers such as silica gel, carbon black, clay, carbon nanotube, carbon particles, and metal powder, or flame retardants such as red phosphorus and phosphate, unless they impair the advantageous effects of the present invention. In particular, it is preferable to add conductive particles such as carbon particles because it serves to produce a CFRP having a dramatically improved conductivity, which is favorable from the viewpoint of lightning resistance and the like in the aircraft industry. From this point of view, the conductivity of a CFRP is preferably 300 Ωcm or less, more preferably 35 Ωcm or less, and still more preferably 20 Ωcm or less, as volume resistivity in the thickness direction. If conductive particles are to be used, the method described in International Publication WO2012/124450, for example, can be used to add conductive particles. The particle diameter of carbon particles can be measured by the light scattering method using, for example, Partica LA-950V2 manufactured by Horiba, Ltd. or MT3300II manufactured by Microtrac.

The heat resistance of a CFRP used for the prepreg according to the present invention depends on the glass transition temperature of the cured resin composition formed by curing the resin composition. To produce a CFRP having a high heat resistance, it is preferable that the cured resin composition formed by curing at 180° C. for 120 minutes have a glass transition temperature of 180° C. or more, more preferably 185° C. or more. The use of a cured resin composition having a glass transition temperature of 180° C. or more serves to produce a CFRP showing good mechanical properties under high temperature, high humidity conditions. To determine the glass transition temperature, a plate of a cured resin composition cut to a specified size is examined by using a dynamic viscoelasticity measuring machine (ARES G2, manufactured by TA Instruments) at a heating rate of 5° C./min and a frequency of 1 Hz, and the temperature at the inflection point in the resulting curve of the storage elastic modulus G' is identified. More specifically, the temperature at the intersection point between the tangent to the storage elastic modulus G' curve in the glass region and the tangent thereto in the transition region is adopted as the glass transition temperature.

The curability of a resin composition according to the present invention affects the curing time required for molding a CFRP by heat-curing. Shortening of the curing time contributes to reduction of the CFRP molding cost. Gel time can serve as an index for evaluating the curability of a resin composition. Here, gel time is the time at the intersection between G' and G" on a graph obtained by using a dynamic viscoelasticity measuring device (ARES G2, manufactured by TA Instruments) equipped with parallel plates with a diameter of 40 mm under the conditions of an angular frequency of 3.14 rad/s, a measuring temperature of 50° C., a heating rate of 1.5° C./min for raising the temperature up to 180° C., with the temperature of 180° C. maintained after reaching 180° C.

A variety of generally known production methods are available for producing a prepreg according to the present invention. An example is the hot melt technique, in which a film of epoxy resin is put on the surface of a carbon fiber sheet prepared by arranging carbon fiber bundles in a sheet-like form, followed by compression and heating for impregnation. In this production method, an epoxy resin composition is coated on a sheet of release paper using a reverse roll coater, knife coater, etc. to prepare an epoxy resin composition film, and attaching this epoxy resin composition film to both sides of a carbon fiber sheet, followed by heating under pressure to impregnate carbon fiber bundles. Furthermore, different resin compositions may be used to impregnate the inner layer of a prepreg and to form the surface layer of the prepreg. In this case, it may also be good to adopt a multi-stage impregnation process in which resin composition films are prepared using different resin compositions and attached to a carbon fiber sheet to impregnate it. The number of stages used in the multi-stage impregnation process is not particularly limited, but it is common to adopt a two stage process.

For the prepreg according to the present invention, the quantity of carbon fiber per unit area is preferably 70 to 2,000 $g/m^2$. If the quantity of carbon fiber is less than 70 $g/m^2$, a larger number of plies have to be laid-up to achieve a required thickness when molding a CFRP, which will require troublesome operation in some cases. If the quantity of carbon fiber is more than 2,000 $g/m^2$, on the other hand, the prepreg tends to have poor draping properties.

The carbon fiber in the prepreg preferably accounts for 50 mass % or more and 80 mass % or less because it serves for both producing a lightweight CFRP and suppressing the formation of voids in the molding step.

The width of the prepreg is not particularly limited and may be as large as several tens of centimeters to 2 m or in the form of a tape having a width of several millimeters to several tens of millimeters, and an appropriate width may be adopted according to purposes. In recent years, in order to improve the efficiency of stacking prepreg plies, machines to perform the techniques called ATL (automated tape laying) and AFP (automated fiber placement), which are designed for automatic stacking of narrow prepreg sheets or prepreg tapes, have come into wide use. Therefore, it is also preferable to adjust the width suitably to these machines. Narrow prepreg plies with widths of about 7.5 cm, about 15 cm, or about 30 cm are often used for the ATL technique whereas prepreg tapes with widths of about 3 mm to about 25 mm are used for the AFP technique. The method to be used for producing a prepreg having a desired width is not particularly limited, and it may be useful to adopt a method for slitting a wide prepreg having a width of about 1 m to 2 m to narrow width. In order to simplify or omit the slitting step, there is another technique that uses special prepreg tapes such as tow prepregs etc. that are originally designed for desired widths.

When a prepreg tape is conveyed in a slit processing device or an AFP device, the path may include points where the prepreg tape is largely bent, such as a small-diameter roll and a folding back point for the prepreg tape. In that case, if the prepreg tape is stiff, the shape conformity of the prepreg tape will be low at such a point where the prepreg tape is largely bent with acute angle as described above, possibly leading to troubles such as deviation of the prepreg tape out of the intended conveyance path and breakage of the prepreg tape in the spliced part. Here, a splice is a device designed to join two or more prepreg tape sections in the length direction by, for example, pressure-bonding. Therefore, it is preferable to maintain the prepreg in a soft state. To soften a prepreg, a likely technique is to appropriately adjust the elastic modulus or fiber diameter of the carbon fibers to be used or adjust a sizing agent, but the effective adjustment range may be limited in some cases from the viewpoint of providing a CFRP with required mechanical properties or suppressing the fuzz of carbon fiber. Furthermore, although a decrease in the thickness of the prepreg serves to increase the apparent softness of the prepreg, there will also limitations in some cases on the adjustment range in terms of the stacking efficiency of prepreg plies. Therefore, it is preferable to reduce the rigidity of the resin composition that is used the matrix resin. At this time, it is preferable that the resin composition used to impregnate the inner layer portion of the prepreg and the resin composition present in the surface layer of the prepreg have different viscoelastic properties. Here, the resin composition used to impregnate the inner layer portion of the prepreg is defined as the first resin composition whereas the resin composition present in the surface layer of the prepreg is defined as the second resin composition. Then, it is preferable for the first resin composition to have desirable viscoelastic properties including a storage elastic modulus G' in the range of $1\times10^4$ Pa or more and $2\times10^6$ Pa or less as measured at 23° C. and 77 rad/s because it can work effectively to soften the prepreg, improve the convey-ability of the prepreg tape, and prevent its breakage in the splice unit. If the G' is in this range, furthermore, it also serves to suppress the deformation of the prepreg tape in the slitting step and allow the prepreg tape to have good width accuracy. To prepare a prepreg having such features, a good method is, for example, to use the multi-stage impregnation method described above.

The present invention uses a dicyclopentadiene type epoxy resin, but it is often in a solid state at room temperature and occasionally acts to excessively increase the G' of the resin composition at room temperature and harden the prepreg. Therefore, in the first prepreg, the components [A2] used to be combined with a dicyclopentadiene type epoxy resin contains liquid epoxy resins as the components [A2-1] and [A2-2], and the mass ratio between them is designed properly to control the G' of the resin composition at room temperature and in turn the hardness of the prepreg. In combination with this, the third prepreg contains a bifunctional glycidyl aniline type epoxy resin that is liquid around room temperature and serves to produce a CFRP with increased tensile strength while reducing the required content of the dicyclopentadiene type epoxy resin, thereby working to control the G' of the resin composition at room temperature and in turn the hardness of the prepreg.

In recent years, the application of the AFP technique has been rapidly expanding, especially in the field of structural materials for aircraft, and it has become very important for data on the convey-ability of prepreg tapes suitable therefor to be fed back to the design of new prepregs and resin compositions. The prepreg tape according to the present invention is not only high in the above-mentioned convey-ability but also high in width accuracy and applicability to the AFP technique.

CFRPs can be produced from the prepreg according to the present invention by, for example, laying up piles of the aforementioned prepreg according to the present invention in an appropriate form and applying heat and pressure to shape them while curing them, which is generally called the heat and pressure molding process. Useful techniques for the heat and pressure molding process include press molding, autoclave molding, bag molding, wrapping tape molding, and internal pressure molding.

In regard to the molding temperature for producing CFRPs, molding is commonly performed in the temperature range of 150° C. to 220° C. when the prepreg according to the present invention is used. Controlling the molding temperature in this temperature range serves to develop an adequate degree of curing.

When a CFRP is produced by the autoclave molding technique, the pressure to be adopted depends on the thickness of the prepreg, the volume content of carbon fiber, etc., but it is commonly in the pressure range of 0.1 to 1 MPa. The use of a molding pressure in this range serves to produce a CFRP that is free of defects such as voids and suffer little dimensional changes such as warping.

CFRPs produced by molding the prepreg according to the present invention will have good tensile strength property, heat resistance, and mode-I interlaminar toughness both in a room temperature environment and in a low temperature environment.

Such tensile strength property can be evaluated in terms of 0° tensile strength measurement. In regard to the 0° tensile strength of a CFRP, the fiber direction of a unidirectional fiber reinforced composite material is defined as its axis direction and this direction is defined as the 0° direction whereas the direction perpendicular to the axis is defined as the 90° direction as described in JIS K7017(1999). The 0° tensile test is performed at room temperature (23° C.) according to the standard described in JIS K7073 (1988). The 0° tensile strength of CFRPs is preferably 2,850 MPa or more, more preferably 2,950 MPa or more, and still more preferably 3,050 MPa or more.

The mode-I interlaminar toughness ($G_{IC}$) can be determined according to JIS K7086 (1993), and the $G_{IC}$ is preferably 250 J/m$^2$ or more because CFRPs with such values can be applied to wider structural members for airframe. $G_{IC}$ is more preferably 280 J/m$^2$ or more and still more preferably 300 J/m$^2$ or more.

In addition, impact resistance can be evaluated in terms of compression strength after impact (hereinafter abbreviated as CAI). In regard to the CAI of CFRPs produced according to the present invention, an impact energy of 6.7 J per millimeter thickness is applied to a test piece as specified in JIS K 7089 (1996) and the CAI measured after this is preferably 230 MPa or more and more preferably 280 MPa or more. The CAI is preferably within this range because CFRPs with such values can be applied to wider structural members for airframe.

Prepreg tapes containing the prepreg according to the present invention and carbon fiber reinforced plastics produced from the prepreg according to the present invention or from the prepreg tape according to the present invention can also be used suitably for producing structural members of aircraft etc.

EXAMPLES

The invention is described in more detail below with reference to Examples. However, it is noted that the scope of the present invention is not limited to these Examples. Hereinafter, the unit "part" used to refer to the proportion of a component means "part by mass" unless otherwise specified. Determination of various characteristics (properties) was performed in an environment at a temperature of 23° C. and relative humidity of 50% unless otherwise specified.

<Raw Materials Used in Examples, Reference Examples, and Comparative Examples>

(1) Component [A1]: Dicyclopentadiene Type Epoxy Resin

EPICLON HP-7200 L (manufactured by DIC Corporation, epoxy equivalent 246 g/eq)

XD-1000-2 L (manufactured by Nippon Kayaku Co., Ltd., epoxy equivalent 240 g/eq)

EPICLON HP-7200 (manufactured by DIC Corporation, epoxy equivalent 260 g/eq)

EPICLON® HP-7200H (dicyclopentadiene type epoxy resin, manufactured by DIC Corporation, epoxy equivalent 278 g/eq, for use in Comparative example)

EPICLON HP-7200HHH (dicyclopentadiene type epoxy resin, manufactured by DIC Corporation, epoxy equivalent 280 g/eq, for use in Comparative example)

(2) Component [A2-1]: Tetrafunctional Liquid Epoxy Resin

Sumiepoxy ELM-434 (tetraglycidyldiaminodiphenyl methane, manufactured by Sumitomo Chemical Co., Ltd., epoxy equivalent 120 g/eq)

(3) Component [A2-2]: Bifunctional Liquid Type Epoxy Resin

EPICLON 830 (bisphenol F type epoxy resin, manufactured by DIC Corporation, epoxy equivalent 171 g/eq)

jER® 825 (bisphenol A type epoxy resin, manufactured by Mitsubishi Chemical Corporation, epoxy equivalent 170 g/eq)

(4) Component [A3]: Bifunctional Glycidyl Aniline Type Epoxy Resin

GOT (glycidyl aniline type epoxy resin (N,N-diglycidyl-o-toluidine), manufactured by Nippon Kayaku Co., Ltd.)

(5) Component [A4]: Epoxy Resin Other than the Components [A1], [A2-1], and [A3]

Araldite MY0510 (triglycidylaminophenol type epoxy resin, manufactured by Huntsman Advanced Materials, epoxy equivalent 101 g/eq)

EPICLON® HP-4770 (naphthalene type epoxy resin, manufactured by DIC Corporation, epoxy equivalent 204 g/eq)

(6) Component [B]: DDS

Seikacure-S (4,4'-DDS, manufactured by Seika K.K, active hydrogen equivalent 62 g/eq)

3,3'-DAS (3,3'-DDS, manufactured by Mitsui Fine Chemical, Inc., active hydrogen equivalent 62 g/eq)

(7) Component [C]: PES

Virantage® VW-10700RFP (PES, manufactured by Solvay Advanced Polymers, weight average molecular weight 21,000 g/mol)

Virantage® VW-10200RFP (PES, manufactured by Solvay Advanced Polymers, weight average molecular weight 46,500 g/mol)

(8) Component [D]: Perfect Spherical Polymer Particles and Component [D-2]: Thermoplastic Resin Particles Polyamide particles 1: Epoxy modified polyamide particles (mode diameter 14 μm, sphericity 97) were prepared by the same procedure as for the epoxy modified polyamide particles described in Examples (Examples 1 and 2, for instance) in International Publication WO 2012/124450. The particle diameter was measured using MT3300II (manufactured by Microtrac, light source 780 nm-3 mW, wet cell (medium: water))

Polyamide particles 2: polyamide 6 particles (mode diameter 15 μm, sphericity 96) prepared by the preparation procedure described below. The particle diameter was measured as for the polyamide particles 1.

With reference to International Publication WO 2018/207728, 200 g of ε-caprolactam (manufactured by Toray Industries, Inc.), 800 g of polyethylene glycol (First Grade Polyethylene Glycol 20,000, manufactured by Wako Pure Chemical Industries, Ltd., weight average molecular weight 18,600) adopted as the polymer of the second component, and 1,000 g of water were fed to a 3 L autoclave equipped with a helical ribbon type stirring blade to form a uniform solution, followed by sealing the autoclave and filling it with nitrogen. Then, the stirring speed was set to 100 rpm and the temperature was raised to 240° C. In this step, after the pressure in the system reached 10 $kg/cm^2$, the pressure was controlled by finely releasing the water vapor so as to maintain the pressure at 10 $kg/cm^2$. After the temperature reached 240° C., the pressure was released at a rate of 0.2 $kg/cm^2 \cdot min$. Then, the temperature was maintained for 1 hour while maintaining a nitrogen flow to complete the polymerization, and the contents were discharged into a 2,000 g water bath to provide a slurry. After dissolving the dissolvable components, filtration was performed, and 2,000 g of water was added to the residue left on the filter, followed by washing it at 80° C. Subsequently, it was passed through a 200 μm sieve and aggregates were removed to provide a slurry liquid. It was filtered again and the isolated residue was dried at 80° C. for 12 hours to provide 140 g of polyamide 6 in a powdery state. The resulting powder has a melting point 218° C. and a crystallization temperature of 170° C., which are the same as those of polyamide 6.

Potato-shaped polyamide particles: Orgasol 1002 D (manufactured by Arkema K.K., sphericity 68)

(9) Component [E]: Carbon Fiber

Torayca® T800G-24K-31E (manufactured by Toray Industries, Inc., carbon fiber with a filament number of 24,000, tensile strength of 5.9 GPa, tensile modulus of 294 GPa, and tensile elongation of 2.0%)

Torayca® T800S-24K-10E (manufactured by Toray Industries, Inc., carbon fiber with a filament number of 24,000, tensile strength of 5.9 GPa, tensile modulus of 294 GPa, and tensile elongation of 2.0%)

(10) Auxiliary Curing Agent (Isophthalic Acid Dihydrazide)

IDH-S (manufactured by Otsuka Chemical Co., Ltd., active hydrogen equivalent 48 g/eq)

(11) Conductive Particles

Mitsubishi conductive carbon black #3230B (particle diameter of primary particles 23 nm (arithmetic average diameter of carbon black particles determined from electron microscopic observation), manufactured by Mitsubishi Chemical Corporation)

Carbon particles NICABEADS ICB2020 (average particle diameter: 20 μm, manufactured by Nippon Carbon Co Ltd.)

<Various Evaluation Methods>

(12) Preparation of Resin Composition

The epoxy resin component [A] and the PES component [C] were kneaded, heated to 150° C. or more, and stirred at the temperature for 1 hour to dissolve the component [C], thereby providing a transparent viscous liquid. After cooling this liquid while kneading, the DDS of the component (B) was added, followed by additional kneading to provide a first epoxy resin composition.

Elsewhere, the epoxy resin component [A] and the PES component [C] were kneaded, heated to 150° C. or more, and stirred at the temperature for 1 hour to dissolve the component [C], thereby providing a transparent viscous liquid. After cooling this liquid while kneading, the component [D] was added and kneaded and in addition, the component [B] was added and kneaded to provide a second epoxy resin composition. In the case where IDH or conductive particles were adopted, furthermore, they were added at the same time as the component [B] for both the first resin composition and the second resin composition.

The proportions of the components used in Examples and Comparative examples are shown in Tables 1 to 7.

(13) Measurement of Viscosity Increase Rate of Resin Composition

The viscosity increase rate of a resin composition was measured using a dynamic viscoelasticity measuring machine (ARES-G2, manufactured by TA Instruments). A specimen of a resin composition was set between upper and lower measuring jigs, which were in the form of parallel flat plates with a diameter of 40 mm, in such a manner that the distance between the upper and lower jig plates was 1 mm, and measurements were taken at an angular frequency of 3.14 rad/s. The viscosity $\eta^*_1$ was measured while maintaining the specimen at 80° C. for 1 minute and the viscosity $\eta^*_{120}$ was measured while maintaining the specimen at 80° C. for 120 minutes. Then, the viscosity increase rate was calculated below. Viscosity increase rate (%)=$(1-\eta^*_{120}/\eta^*_1)\times 100$%

(14) Measurement of G' of Resin Composition

The G' (storage elastic modulus) of a resin composition was measured using a dynamic viscoelasticity measuring machine (ARES-G2, manufactured by TA Instruments). A specimen of a resin composition was set between upper and lower measuring jigs, which were in the form of parallel flat plates with a diameter of 8 mm, in such a manner that the distance between the upper and lower jig plates was 0.5 mm, and measurements were taken at a strain rate of 77 rad/s while heating the specimen at a heating rate of 2.0° C./min. G' at 23° C. was read from a G' curve recorded while heating the specimen.

(15) Measurement of Gel Time of Resin Composition

The gel time of a resin composition was measured using a dynamic viscoelasticity measuring machine (ARES-G2, manufactured by TA Instruments).

A specimen of a resin composition was set between upper and lower measuring jigs, which were in the form of parallel flat plates with a diameter of 40 mm, in such a manner that the distance between upper and lower jig plates was 1 mm, and measurements were taken at a strain rate of 3.14 rad/s while heating the specimen from 50° C. to 180° C. at a heating rate of 1.5° C./min. After reaching 180° C., the temperature of 180° C. was maintained to determine the time at which G' and G" made an intersection.

(16) Measurement of Glass Transition Temperature of Cured Product of Resin Composition A resin composition was injected in a mold, then heated up in a hot air drier from 30° C. at a rate of 1.5° C./min, heat-cured at 180° C. for 2 hours, and cooled to 30° C. at a rate of 2.5° C./min to prepare a cured resin plate with a thickness of 2 mm.

A test piece with a width of 12.7 mm and a length of 55 mm was cut out of the cured resin plate prepared above and its glass transition temperature was determined by the DMA technique according to SACMA SRM18R-94.

The temperature at the intersection point between the tangent to the storage elastic modulus G' curve in the glass region and the tangent thereto in the transition region was adopted as the glass transition temperature. Here, measurements were taken under the conditions of a heating rate of 5.0° C./min and a frequency of 1 Hz.

(17) Preparation of Prepreg

In Examples given below, prepreg samples were prepared by the two-stage impregnation technique as described below. Silicone was coated on a sheet of release paper and the first resin composition or the second resin composition prepared in the above paragraph (12) was coated uniformly on top of it. First resin films and second resin films were prepared in this way. A layer of carbon fibers arranged uniformly in one direction was sandwiched between two first resin films and heated under pressure using a press roll to provide a primary prepreg containing a carbon fiber layer impregnated with the first epoxy resin composition (resin content 20 mass %). After the impregnation with the first resin composition, both release paper sheets were removed from the primary prepreg. Subsequently, the primary prepreg was sandwiched between two second resin films and heated under pressure using a press roll to provide a prepreg containing the primary prepreg impregnated with the second resin composition (resin content 34 mass %).

(18) Measurement of 0° Tensile Strength of CFRP

Sheets of a specified size were cut out of a unidirectional prepreg and four of them were stacked in one direction, subjected to vacuum bag molding, and cured in an autoclave for 2 hours at a temperature of 180° C. and a pressure of 6 kg/cm$^2$, thereby providing a layered body. This unidirectional reinforced material was cut to a width of 12.7 mm and a length of 230 mm, and glass fiber reinforced plastic tabs of 1.2 mm and a length of 50 mm was adhered to both ends to prepare a test piece. This test piece was subjected to 0° tensile strength test according to JIS K7073 (1988) using an Instron type universal tester. Measurements were taken at room temperature (23° C.) and, in some cases, at a low temperature (−60° C.). The strength retention rate, i.e. the ratio between the tensile strength in the low temperature environment and the tensile strength in the room temperature environment, is calculated by the formula given below.

Strength retention rate (%)=tensile strength(in low temperature environment)/tensile strength(in room temperature environment)×100

(19) Preparation of Flat Composite Plate for Mode-I Interlaminar Toughness ($G_{IC}$) Test and Implementation of $G_{IC}$ Measurement A flat composite plate for mode-I interlaminar toughness ($G_{IC}$) test was prepared by the following steps (a) to (e) according to JIS K7086 (1993).

(a) A total of 12 unidirectional prepreg plies each having a carbon fiber mass of 268 g/m$^2$ prepared in the paragraph (17) were stacked with the fibers aligned in one direction, and 20 unidirectional prepreg plies each having a carbon fiber mass of 194 g/m$^2$ were stacked similarly. In doing this, a fluorine resin film with a width of 40 mm was inserted perpendicularly to the fiber alignment direction as a central layer (between the 6th and the 7th of the plies each having a carbon fiber mass of 268 g/m$^2$, or between the 10 th and the 11th of the plies each having a carbon fiber mass of 194 g/m$^2$).

(b) A stack of prepreg plies was subjected to vacuum bag molding and cured in an autoclave for 2 hours at a temperature of 180° C. and a pressure of 6 kg/cm$^2$, thereby providing a layered body.

(c) The unidirectional CFRP prepared in the step (b) was cut to a width of 20 mm and a length of 195 mm. Cutting was performed so that the fibers in the test piece were parallel to the length direction.

(d) A pin-loading block (length 25 mm, aluminum) as specified in JIS K7086 (1993) was attached to an end (the end where the fluorine resin film was inserted) of the test piece.

(e) A white paint was applied to both side faces of the test piece to ensure easy observation of the propagation of cracking.

(f) The test piece prepared above was used to make $G_{IC}$ measurements by the following procedure. Test was carried out using an Instron type universal tester (manufactured by Instron Corporation) according to Appendix 1 of JIS K7086 (1993). The crosshead speed was 0.5 mm/min before the length of cracking reached 20 mm and increased to 1 mm/min after it reached 20 mm. The test was continued until the cracking reached a length of 100 mm, and the $G_{IC}$ was calculated from the relevant area in a load-displacement graph obtained from the test.

(20) Measurement of Compression Strength after Impact (CAI) of CFRP

A total of 16 unidirectional prepreg plies each having a carbon fiber mass of 268 g/m$^2$ were stacked quasi-isotropically as [+45°/0°/−45°/90°]2s or 24 similar plies each having a carbon fiber mass of 194 g/m$^2$ were stacked quasi-isotropically as [+45°/0°/−45°/90°]3s, and then molded in an autoclave for 2 hours at a temperature of 180° C., a pressure of 6 kg/cm$^2$, and a heating rate of 1.5° C./min to provide a CFRP. A sample with a length of 150 mm and a width of 100 mm was cut out of this CFRP, and a drop weight impact of 6.7 J/mm was applied to the center of the sample according to SACMA SRM 2R-94, followed by determining the compression strength after impact.

(21) Measurement of Thickness-Directional Conductivity of CFRP

A total of 16 unidirectional prepreg plies each having a carbon fiber mass of 268 g/m$^2$ were stacked quasi-isotropically as [+45°/0°/−45°/90°]2s or 24 similar plies each having a carbon fiber mass of 194 g/m$^2$ were stacked quasi-isotropically as [+45°/0°/−45°/90°]3s, and then molded in an autoclave for 2 hours at a temperature of 180° C., a pressure of 6 kg/cm$^2$, and a heating rate of 1.5° C./min to provide a CFRP. A sample with a length of 40 mm and a width of 40 mm was cut out of the resulting CFRP and the resin layers on both surfaces were removed by polishing. Then, a conductive paste (N-2057, manufactured by Shoei Chemical Inc.) was coated over both surfaces to a thickness of about 70 μm using a bar coater and cured by heating for 30 minutes in a hot air oven adjusted to a temperature of 180° C. to provide a sample for conductivity evaluation. The thickness-directional resistance of the resulting sample was measured by the four terminal method using a digital multimeter (R6581, manufactured by Advantest Corporation). Six measurements were taken and the average was adopted to represent the thickness-directional volume resistivity (0 cm) of the CFRP. The first prepreg was examined in Examples 1 to 17, Reference example 1, and Comparative examples 1 to 7.

Examples 1 to 3

As described in the above paragraph (12), a first epoxy resin composition was prepared by mixing EPICLON HP-7200 L (epoxy equivalent 246 g/eq) as the component [A1], Sumiepoxy ELM-434 as the component [A2-1], EPICLON® 830 as the epoxy resin of the component [A2-2], 4,4'-DDS as the component [B], and Virantage VW-10700RFP (weight average molecular weight 21,000 g/mol) as the component [C] according to the proportions specified in Table 1. Then, as described in the above paragraph (12), a second epoxy resin composition was prepared by mixing EPICLON® HP-7200 L (epoxy equivalent 246 g/eq) as the component [A1], Sumiepoxy ELM-434 as the component [A2-1], EPICLON 830 as the component [A2-2], 4,4'-DDS as the component [B], Virantage VW-10700RFP (weight average molecular weight 21,000 g/mol) as the component [C], and polyamide particles 1 as the component [D] according to the proportions specified in Table 1.

In addition, using Torayca® T800G-24K-31E as carbon fiber and also using the first and second resin compositions prepared above, a prepreg was produced as described in the above paragraph (17). The prepreg had a carbon fiber mass of 268 g/m$^2$.

As seen in Table 1, CFRPs having a high 0° tensile strength, $G_{IC}$, heat resistance, and CAI were obtained by adjusting the contents of the dicyclopentadiene type epoxy resin of the component [A1] and the liquid epoxy resin of the component [A2] in the optimum ranges.

Comparative Examples 1 to 7 and Reference Example 1

A prepreg was prepared in the same way as in Example 2 according to the proportions specified in Table 2.

In Comparative example 1, the content of the dicyclopentadiene type epoxy resin was so small that the resulting CFRP was inferior in terms of tensile strength.

In Reference example 1, the content of the dicyclopentadiene type epoxy resin, which is solid at room temperature, was excessively large from the viewpoint of the first prepreg while the content of the epoxy resin of the [A2], which is liquid at room temperature, is excessively small, resulting in a resin composition having an excessively high G' value at room temperature. Accordingly, the resulting prepreg was hard at room temperature and inferior in handleability. Here, the 0° tensile strength at −60° C. was 3,160 MPa, and the strength retention rate at −60° C. was 96%.

In Comparative example 2, the [A2-1]/[A2-2] ratio was excessively high, and accordingly, the resulting CFRP was low in tensile strength.

In Comparative example 3, the [A2-1]/[A2-2] ratio was excessively high, and accordingly, the resulting CFRP was low in tensile strength as in Comparative example 2. In addition, the combined use of a triglycidylaminophenol type epoxy resin led to a low viscosity stability at 80° C.

In Comparative example 4, the [A2-1]/[A2-2] ratio was excessively low, and accordingly, the heat resistance was low.

In Comparative example 5, PES was not contained, and accordingly, the resulting CFRP was insufficient in tensile strength. In addition, the resin flow was so large in the molding step that the resulting CFRP deteriorated in quality.

In Comparative example 6, the polymer particles used were non-perfect spherical polyamide particles (Orgasol 1002 D), and therefore, the resulting CFRP was insufficient in impact resistance (CAI).

In Comparative example 7, the dicyclopentadiene type epoxy resin had an excessively large epoxy group equivalent, and accordingly, the compatibility with PES deteriorated, resulting in the problem of a large unevenness in areal weight during the resin film preparation step.

Examples 4 to 9

A prepreg was prepared in the same way as in Example 2 according to the proportions specified in Table 3.

In Example 4, the dicyclopentadiene type epoxy resin had a large epoxy group equivalent, and accordingly, the compatibility with PES was so low that a larger unevenness in areal weight than in Example 2 occasionally occurred during the resin film preparation step, although it was not so serious as to cause problems.

In Example 5, the [A2-1]/[A2-2] ratio was high, and accordingly, the heat resistance increased.

In Example 6, the resulting CFRP had improved tensile strength as compared with Example 1 as a result of the combined use of a glycidyl aniline type epoxy resin as the bifunctional liquid epoxy resin component. Furthermore, because of a large content of the liquid epoxy resin, the G' of the resin composition at room temperature was effectively decreased to provide a soft prepreg with high handleability. In this way, the combined use of a glycidyl aniline type epoxy resin served to realize a high-level balance among CFRP's mechanical strength and heat resistance and prepreg's handleability.

In Example 7, 3,3'-DDS was used as the DDS component, and consequently, the viscosity stability at 80° C. was slightly lower than that in Example 2, although it was not so serious as to cause problems.

In Example 8, the PES in use had a high molecular weight and a lower compatibility with the dicyclopentadiene type epoxy resin, and consequently, a larger unevenness in areal weight than in Example 2 occasionally occurred during the resin film preparation step, although it was not so serious as to cause problems.

In Comparative example 9, the polyamide particles 2 were used as the perfect spherical polymer particles component, and the resulting CFRP had high impact resistance (CAI).

Example 10

A prepreg was prepared in the same way as in Example 2 according to the proportions specified in Table 4.

In this Example, the inclusion of IDH served to shorten the gel time to 84 minutes as compared with the 101 minutes in Example 2, proving its contribution to the shortening of the molding time. Here, it was also found that the resulting prepreg and CFRP had high handleability and good mechanical properties, respectively.

Example 11

A prepreg was prepared in the same way as in Example 2 according to the proportions specified in Table 4.

Conductive particles were added in this Example, and consequently, the resulting CFRP had a thickness-directional volume resistivity of 15 Ωcm, showing an improved conductivity as compared with that of $10^5$ 0 cm in Example 2. This raises an expectation that the application of this material to aircraft may serve to achieve an improvement in lightning resistance. Here, it was also found that the resulting prepreg and CFRP had high handleability and good mechanical properties, respectively.

Example 12

A prepreg was prepared in the same way as in Example 2 according to the proportions specified in Table 4.

The resin composition prepared in this Example had a gel time of 84 minutes, which is shorter than the 101 minutes in Example 2, proving its contribution to the shortening of the molding time. In addition, the resulting CFRP had a thickness-directional volume resistivity of 16 Ωcm, showing an improved conductivity as compared with that of $10^5$ 0 cm in Example 2. Here, it was also found that the resulting prepreg and CFRP had high handleability and good mechanical properties, respectively.

Example 13

Except for excluding carbon black, a resin composition was prepared and a prepreg was produced in the same way as in Example 11. Favorable characteristics were realized as in the case of Example 11. In addition, the resulting CFRP had a thickness-directional volume resistivity of 300 Ωcm.

Example 14

Except for using Torayca® T800S-24K-10E as the carbon fiber component and changing the content of carbon particles, a resin composition was prepared and a prepreg was produced in the same way as in Example 13. The resulting CFRP had a thickness-directional volume resistivity of 14 Ωcm.

Example 15

The prepreg prepared in each of Examples 1 to 14 was slit to a width of 1 inch. After the slitting step, the resulting prepreg tape showed a sufficiently high convey-ability without causing problems, showed high shape conformity, and suffered no breakage in the spliced part.

Example 16

Plies of the prepreg tape prepared in Example 15 were stacked using a automated lay-up machine. The prepreg tape showed a sufficiently high convey-ability without causing problems, showed high shape conformity, and suffered no breakage in the spliced part.

Example 17

Plies of the prepreg tape prepared in Example 15 were stacked and shaped to produce a CFRP, which was found to show almost as good mechanical properties as realized in Examples 1 to 14.

The second prepreg was examined in Examples 18 to 32, Reference example 2, and Comparative examples 8 to 15.

Example 18

In the same way as in the paragraph (12), a first resin composition was prepared by mixing 45 parts of EPICLON® HP-7200 L (epoxy equivalent 246 g/eq) as the component [A1], 30 parts of Sumiepoxy® ELM-434 as the component [A2-1], 25 parts of EPICLON® 830 as an epoxy resin other than the components [A1] and [A2-1], 40 parts of 4,4'-DDS as the component [B], and 8 parts of Virantage® VW-10700RFP (weight average molecular weight 21,000 g/mol) as the component [C]. Then, in the same way as in the paragraph (12), a second resin composition was prepared by mixing 45 parts of EPICLON® HP-7200 L (epoxy equivalent 246 g/eq) as the component [A1], 30 parts of Sumiepoxy® ELM-434 as the component [A2-1], 25 parts of EPICLON® 830 as an epoxy resin other than the components [A1] and [A2-1], 40 parts of 4,4'-DDS as the component [B], 8 parts of Virantage® VW-10700RFP (weight average molecular weight 21,000 g/mol) as the component [C], and 37 parts of the polyamide particles 1 prepared by the procedure described in the paragraph (8) as the component [D-2].

In addition, using Torayca® T800G-24K-31E as the component [E], a prepreg was produced from the first and second resin compositions prepared above in the same way as in the paragraph (17). The prepreg had a carbon fiber mass of 194 g/m$^2$.

As seen in Tables 5 and 6, CFRPs having a high strength retention rate, $G_{IC}$, and heat resistance were obtained by adjusting the contents of the dicyclopentadiene type epoxy resin and the tetrafunctional liquid type epoxy resin in the optimum ranges.

(Examples 19 to 23 and 27 to 30, Reference example 2, and Comparative examples 8 to 12) A prepreg was prepared in the same way as in Example 18 from a resin composition according to the proportions specified Tables 5 to 7.

As seen in Tables 5 and 6, a CFRP having a high heat resistance, strength retention rate, and $G_{IC}$ was obtained in Examples 19 to 23 by adopting a dicyclopentadiene type epoxy resin having an epoxy equivalent of 200 g/eq or more and 265 g/eq or less and adjusting its content favorably. Furthermore, it was found in Examples 19, 20, and 27 to 30 that the gel time shortened with an increasing proportion of IDH ($H_F$/E). In addition, a good balance between curing time shortening effect and heat resistance was realized in Examples 19, 20, 29, and 30 where the IDH content was in a favorable.

As seen in Table 7, the proportion of dicyclopentadiene type epoxy resin is outside the preferable range for the second prepreg in Reference example 2 and Comparative example 8, and the strength retention rate and $G_{IC}$ in Reference example 2 were lower than in Example 18. It is noted that in Reference example 2, the viscosity increase rate of a resin composition maintained at 80° C. for 2 hours was 10% for both the first resin composition and the second resin composition, and the G' at 23° C. and 77 rad/sec was $3.0\times10^5$ Pa for the first resin composition and $3.2\times10^5$ Pa for the second resin composition. In Comparative example 8, the proportion of the dicyclopentadiene type epoxy resin was so large that the PES and the epoxy resin were unable to be compatible with each other, and it was impossible to produce a uniform cured resin product and produce a resin film. Comparative example 9 did not use a dicyclopentadiene type epoxy resin, but used an epoxy resin other than that, and consequently, the strength retention rate and $G_{IC}$ were lower than in Example 18. In Comparative examples 10 and 11, the epoxy equivalent of the dicyclopentadiene type epoxy resin blended was larger than the favorable range (the component [A1] in Comparative example 10 had an epoxy equivalent of 278 g/eq, and the component [A1] in Comparative example 11 had an epoxy equivalent of 280 g/eq), and the PES and the epoxy resin were unable to be compatible with each other, making it impossible to produce a uniform resin plate and produce a resin. Comparative example 12 did not use a dicyclopentadiene type epoxy resin while using a tetrafunctional liquid type epoxy resin in a large proportion, resulting in a lower strength retention rate and $G_{IC}$ than in Example 18.

Examples 24 to 26 and Comparative Example 13

An epoxy resin composition was prepared according to the proportions specified in Tables 5 to 7, and a prepreg was produced in the same way as in Example 18. Here, in the case where 60 parts of EPICLON® HP-7200 (epoxy equivalent 260 g/eq) as the component [A1], 25 parts of Sumiepoxy® ELM-434, and 15 parts of EPICLON® 830 were adopted as epoxy resin components to prepare an epoxy resin composition and then a prepreg was produced therefrom, it was found that the prepreg failed to have as high quality as in Example 18 due to a low compatibility between HP-7200 and PES. Therefore, another prepreg was produced after decreasing the quantity of HP-7200 to 45 parts. (Example 24)

Compared with this, in Example 25, a prepreg was produced using 8 parts of Virantage® VW-10200RFP, which has a larger weight average molecular weight (weight average molecular weight 46,500 g/mol), as PES of the component [C], but the prepreg failed to have as high quality as in Example 18, and therefore, another prepreg was produced using 4 parts of Virantage VW-10200RFP as specified under Example 25 in Table 1. (Example 25) As seen in Tables 5 and 6, a CFRP having a high heat resistance, strength retention rate, $G_{IC}$ was obtained in each of Examples 24 to 26, where the proportions of the dicyclopentadiene type epoxy resin and the tetrafunctional liquid type epoxy resin were in the optimum ranges, and a CFRP having a particularly high heat resistance was obtained in Examples 24 and 25, where the proportion of the tetrafunctional liquid type epoxy resin was higher.

As seen in Table 7, the content of the tetrafunctional liquid type epoxy resin was not in the optimum range for the second prepreg in Comparative example 13, the heat resistance in Comparative example 13 was lower than in Example 18.

Examples 27, 28, and 30 and Comparative Example 14

An epoxy resin composition was prepared according to the proportions specified in Tables 5 to 7, and a prepreg was produced in the same way as in Example 18.

As seen in Tables 5 and 6, a CFRP having a high strength retention rate and $G_{IC}$ was obtained in each of Examples 27, 28, and 30, where PES was added in optimum proportions. In Example 28, a CFRP having a particularly high strength retention rate and $G_{IC}$ was obtained due to the addition of PES in an increased proportion.

As seen in Table 7, the strength retention rate in Comparative example 14 was lower than in Example 18 due to the absence of PES.

Examples 31 and 32

An epoxy resin composition was prepared according to the proportions specified in Table 8, and a prepreg was produced in the same way as in Example 18. As seen in Table 8, in Example 31, where conductive particles were included, the thickness-directional volume resistivity was 14 Ωcm, showing a higher conductivity than in Example 32 (volume resistivity $10^5$ Ωcm) where conductive particles were not included.

The third prepreg was examined in Examples 6 and 33, Reference example 1, and Comparative examples 1 and 15.

In Reference example 1 (figures in Table 2 are also included in Table 9), the content of the dicyclopentadiene type epoxy resin was so large that the G' of the resin composition at room temperature was excessively high, and the prepreg tape produced therefrom might be seriously low in convey-ability and stackability depending on the conditions in the automated lay-up step for the prepreg tape.

In Comparative example 1 (figures in Table 2 are also included in Table 9), on the other hand, the content of the dicyclopentadiene type epoxy resin was small and the combined use of a bifunctional glycidyl aniline type epoxy resin was omitted, resulting in a CFRP with a decreased 0° tensile strength.

In Example 6 (figures in Table 3 are also included in Table 9), the content of the dicyclopentadiene type epoxy resin was decreased and a bifunctional glycidyl aniline type epoxy resin was used in combination, resulting in a CFRP with a sufficiently high 0° tensile strength and a first resin composition with a G' at room temperature in a favorable range to ensure a high convey-ability in the automated lay-up step.

Another resin composition and prepreg were prepared in the same way as in Example 14 using Torayca® T800S-24K-10E as carbon fiber with other resin composition components according to the proportions specified in Table 9. The prepreg had a carbon fiber mass of 268 g/m$^2$ (Example 33). In Example 33, the CFRP obtained had not only good dynamic physical properties but also a high thickness-directional volume resistivity of 14 Ωcm, showing a high conductivity. Furthermore, the G' of the resin composition at room temperature was also in a favorable range to ensure a high convey-ability in the automated lay-up step. In addition, the resin composition maintained at 80° C. for 2 hours had a viscosity increase rate of 10%.

On the other hand, in Comparative example 15, the resulting CFRP was inferior in terms of 0° tensile strength because the addition of a dicyclopentadiene type epoxy resin was omitted although a bifunctional glycidyl aniline type epoxy resin was included.

TABLE 1

| | | | Example 1 | | Example 2 | | Example 3 | |
|---|---|---|---|---|---|---|---|---|
| 1: first resin composition 2: second resin composition | | | 1 | 2 | 1 | 2 | 1 | 2 |
| epoxy resin | component [A1] | EPICLON ® HP-7200L (epoxy equivalent: 246 g/eq) | 10 | 10 | 30 | 30 | 42 | 42 |
| | component [A2-1] | Sumiepoxy ® ELM-434 | 60 | 60 | 50 | 50 | 28 | 28 |
| | component [A2-2] | EPICLON ® 830 | 30 | 30 | 20 | 20 | 30 | 30 |
| curing agent | component [B] | 4,4'-DDS (Seikacure-S) | 44 | 44 | 41 | 41 | 36 | 36 |
| PES | component [C] | Virantage ® VW-10700RFP (weight average molecular weight 21,000 g/mol) | 9 | 14 | 6 | 13 | 6 | 13 |
| perfect spherical polymer particles | component [D] | polyamide particles 1 (sphericity 97) | 0 | 36 | 0 | 35 | 0 | 35 |
| [A2-1]/[A2-2] | | | 2.0 | 2.0 | 2.5 | 2.5 | 0.9 | 0.9 |
| $H_E$/E of DDS | | | 1.0 | 1.0 | 1.0 | 1.0 | 1.0 | 1.0 |
| properties of resin composition | viscosity increase rate (80° C. × 2 h) | | 10% | 10% | 10% | 10% | 10% | 10% |
| | G' (23° C., 77 rad/s) | | 2.5x$10^5$ | 3.2 × $10^6$ | 3.8 × $10^5$ | 2.0 × $10^7$ | 1.1 × $10^6$ | 3.5 × $10^7$ |
| | glass transition temperature (° C.) | | 208 | | 209 | | 185 | |
| properties of CFRP | 0° tensile strength (MPa) | | 2,910 | | 2,980 | | 3,240 | |
| | $G_{IC}$ (J/m$^2$) | | 286 | | 350 | | 354 | |
| | CAI (MPa) | | 290 | | 305 | | 310 | |

TABLE 2

| | | | Comparative example 1 | | Reference example 1 | | Comparative example 2 | | Comparative example 3 | | Comparative example 4 | |
|---|---|---|---|---|---|---|---|---|---|---|---|---|
| 1: first resin composition<br>2: second resin composition | | | 1 | 2 | 1 | 2 | 1 | 2 | 1 | 2 | 1 | 2 |
| epoxy resin | component [A1] | EPICLON ® HP-7200L (epoxy equivalent: 246 g/eq) | 3 | 3 | 50 | 50 | 10 | 10 | 10 | 10 | 30 | 30 |
| | | EPICLON ® HP-7200HHH (epoxy equivalent: 280 g/eq) | — | — | — | — | — | — | — | — | — | — |
| | component [A2-1] | Sumiepoxy ® ELM-434 | 50 | 50 | 30 | 30 | 77 | 77 | 41 | 41 | 25 | 25 |
| | component [A2-2] | EPICLON ® 830 | 47 | 47 | 20 | 20 | 13 | 13 | 9 | 9 | 45 | 45 |
| | trifunctional epoxy resin | Araldite ® MY0510 | — | — | — | — | — | — | 40 | 40 | — | — |
| curing agent | component [B] | 4,4'-DDS (Seikacure-S) | 44 | 44 | 35 | 35 | 47 | 47 | 52 | 52 | 37 | 37 |
| PES | component [C] | Virantage ® VW-10700RFP (weight average molecular weight 21,000 g/mol) | 6 | 13 | 12 | 8 | 6 | 13 | 6 | 13 | 6 | 13 |
| perfect spherical polymer particles | component [D] | polyamide particles 1 (sphericity 97) | 0 | 35 | 0 | 32 | 0 | 35 | 0 | 35 | 0 | 35 |
| | | Orgasol ® 1002D (sphericity 68) | — | — | — | — | — | — | — | — | — | — |
| [A2-1]/[A2-2] | | | 1.1 | 1.1 | 1.5 | 1.5 | 5.9 | 5.9 | 4.6 | 4.6 | 0.6 | 0.6 |
| properties of resin composition | viscosity increase rate (80° C. × 2 h) | | — | — | — | — | — | — | 25% | 25% | — | — |
| | G' (23° C., 77 rad/s) | | 9.0 × $10^4$ | 6.8 × $10^s$ | 6.0 × $10^7$ | 3.8 × $10^7$ | — | — | — | — | — | — |
| | glass transition temperature (° C.) | | 198 | | — | — | 219 | | 214 | | 178 | |
| properties of CFRP | 0° tensile strength (MPa) | | 2,705 | | 3,300 | | 2,790 | | 2,777 | | 3,251 | |
| | $G_{IC}$ (J/m$^2$) | | — | — | — | — | — | — | — | — | — | — |
| | CAI (MPa) | | — | — | — | — | — | — | — | — | — | — |

| | | | Comparative example 5 | | Comparative example 6 | | Comparative example 7 | |
|---|---|---|---|---|---|---|---|---|
| 1: first resin composition<br>2: second resin composition | | | 1 | 2 | 1 | 2 | 1 | 2 |
| epoxy resin | component [A1] | EPICLON ® HP-7200L (epoxy equivalent: 246 g/eq) | 20 | 20 | 30 | 30 | — | — |
| | | EPICLON ® HP-7200HHH (epoxy equivalent: 280 g/eq) | — | — | — | — | 30 | 30 |
| | component [A2-1] | Sumiepoxy ® ELM-434 | 60 | 60 | 50 | 50 | 50 | 50 |
| | component [A2-2] | EPICLON ® 830 | 20 | 20 | 20 | 20 | 20 | 20 |
| | trifunctional epoxy resin | Araldite ® MY0510 | — | — | — | — | — | — |
| curing agent | component [B] | 4,4'-DDS (Seikacure-S) | 44 | 44 | 40 | 40 | 40 | 40 |
| PES | component [C] | Virantage ® VW-10700RFP (weight average molecular weight 21,000 g/mol) | 0 | 0 | 6 | 13 | 6 | 13 |
| perfect spherical polymer particles | component [D] | polyamide particles 1 (sphericity 97) | 0 | 35 | 0 | 0 | 0 | 35 |
| | | Orgasol ® 1002D (sphericity 68) | — | — | 0 | 35 | — | — |
| [A2-1]/[A2-2] | | | 3.0 | 3.0 | 2.5 | 2.5 | 2.5 | 2.5 |
| properties of resin composition | viscosity increase rate (80° C. × 2 h) | | — | — | — | — | — | — |
| | G' (23° C., 77 rad/s) | | — | — | — | — | — | — |
| | glass transition temperature (° C.) | | — | — | — | — | — | — |
| properties of CFRP | 0° tensile strength (MPa) | | 2,773 | | 2,834 | | — | — |
| | $G_{IC}$ (J/m$^2$) | | — | — | — | | — | — |
| | CAI (MPa) | | — | — | 223 | | — | — |

TABLE 3

| | | | Example 4 | | Example 5 | | Example 6 | | Example 7 | | Example 8 | | Example 9 | |
|---|---|---|---|---|---|---|---|---|---|---|---|---|---|---|
| 1: first resin composition 2: second resin composition | | | 1 | 2 | 1 | 2 | 1 | 2 | 1 | 2 | 1 | 2 | 1 | 2 |
| epoxy resin | component [A1] | EPICLON ® HP-7200L (epoxy equivalent: 246 g/eq) | — | — | — | — | 10 | 10 | 30 | 30 | 15 | 15 | 30 | 30 |
| | | EPICLON ® HP-7200 (epoxy equivalent: 260 g/eq) | 30 | 30 | — | — | — | — | — | — | — | — | — | — |
| | | XD-1000-2 L (epoxy equivalent: 240 g/eq) | — | — | 20 | 20 | — | — | — | — | — | — | — | — |
| | component [A2-1] | Sumiepoxy ® ELM-434 | 50 | 50 | 62 | 62 | 60 | 60 | 50 | 50 | 55 | 55 | 50 | 50 |
| | component [A2-2] | EPICLON ® 830 | 20 | 20 | 18 | 18 | 0 | 0 | 20 | 20 | 30 | 30 | 20 | 20 |
| | | GOT | — | — | — | — | 30 | 30 | — | — | — | — | — | — |
| curing agent | component [B] | 4,4'-DDS (Seikacure-S) | 40 | 40 | 44 | 44 | 45 | 45 | 0 | 0 | 43 | 43 | 41 | 41 |
| | | 3,3'-DDS (3,3'-DAS) | | | | | | | 41 | 41 | — | — | — | — |
| PES | component [C] | Virantage ® VW-10700RFP (weight average molecular weight 21,000 g/mol) | 6 | 13 | 6 | 13 | 6 | 13 | 6 | 13 | — | — | 6 | 13 |
| | | Virantage ® VW-10200 RFP (weight average molecular weight 46,500 g/mol) | — | — | — | — | — | — | — | — | 6 | 13 | — | — |
| perfect spherical polymer particles | component [D] | polyamide particles 1 (sphericity 97) | 0 | 35 | 0 | 35 | 0 | 35 | 0 | 35 | 0 | 35 | — | — |
| | | polyamide particles 2 (sphericity 96) | — | — | — | — | — | — | — | — | — | — | 0 | 35 |
| [A2-1]/[A2-2] | | | 2.5 | 2.5 | 3.4 | 3.4 | 2.0 | 2.0 | 2.5 | 2.5 | 1.8 | 1.8 | 2.5 | 2.5 |
| $H_E/E$ of DDS | | | 1.0 | 1.0 | 1.0 | 1.0 | 1.0 | 1.0 | 1.0 | 1.0 | 1.0 | 1.0 | 1.0 | 1.0 |
| properties of resin composition | viscosity increase rate (80° C. × 2 h) | | 10% | 10% | 10% | 10% | 10% | 10% | 15% | 15% | 12% | 12% | 12% | 12% |
| | G' (23° C., 77 rad/s) | | $4.5 \times 10^5$ | $2.4 \times 10^7$ | $3.2 \times 10^5$ | $9.6 \times 10^6$ | $2.3 \times 10^5$ | $3.5 \times 10^6$ | $3.8 \times 10^5$ | $2.0 \times 10^7$ | $3.6 \times 10^5$ | $5.4 \times 10^6$ | $3.8 \times 10^5$ | $2.0 \times 10^7$ |
| | glass transition temperature (° C.) | | 207 | | 211 | | 203 | | 194 | | 207 | | 207 | |
| properties of CFRP | 0° tensile strength (MPa) | | 3,045 | | 2,912 | | 2,950 | | 3,084 | | 2,914 | | 3,089 | |
| | $G_{IC}$ (J/m$^2$) | | 357 | | 331 | | 322 | | 391 | | 332 | | 324 | |
| | CAI (MPa) | | 303 | | 294 | | 301 | | 311 | | 286 | | 293 | |

TABLE 4

| | | | Example 10 | | Example 11 | | Example 12 | |
|---|---|---|---|---|---|---|---|---|
| 1: first resin composition 2: second resin composition | | | 1 | 2 | 1 | 2 | 1 | 2 |
| epoxy resin | component [A1] | EPICLON ® HP-7200L (epoxy equivalent: 246 g/eq) | 30 | 30 | 30 | 30 | 30 | 30 |
| | component [A2-1] | Sumiepoxy ® ELM-434 | 50 | 50 | 50 | 50 | 50 | 50 |
| | component [A2-2] | EPICLON ® 830 | 20 | 20 | 20 | 20 | 20 | 20 |
| curing agent | component [B] | 4,4'-DDS (Seikacure-S) | 36 | 36 | 41 | 41 | 36 | 36 |
| | auxiliary curing agent | IDH-S | 5 | 5 | — | — | 5 | 5 |
| PES | component [C] | Virantage ® VW-10700RFP (weight average molecular weight 21,000 g/mol) | 6 | 13 | 6 | 13 | 6 | 13 |
| perfect spherical polymer particles | component [D] | polyamide particles 1 (sphericity 97) | 0 | 35 | 0 | 35 | 0 | 35 |

TABLE 4-continued

| | | | | | | | | |
|---|---|---|---|---|---|---|---|---|
| electric conductivity particles | carbon black | #3230 B | — | — | 2 | 2 | 2 | 2 |
| | carbon particles | NICABEADS ® ICB2020 | — | — | — | 6 | — | 6 |
| [A2-1]/[A2-2] | | | 2.5 | 2.5 | 2.5 | 2.5 | 2.5 | 2.5 |
| $H_E$/E of DDS | | | 0.85 | 0.85 | 1.0 | 1.0 | 0.85 | 0.85 |
| $H_F$/E of IDH | | | 0.15 | 0.15 | — | — | 0.15 | 0.15 |
| properties of resin composition | viscosity increase rate (80° C. × 2 h) | | 15% | 15% | 10% | 10% | 15% | 15% |
| | G' (23° C., 77 rad/s) | | 3.8 × $10^5$ | 2.0 × $10^7$ | 3.8 × $10^5$ | 2.0 × $10^7$ | 3.8 × $10^5$ | 2.0 × $10^7$ |
| | glass transition temperature (° C.) | | 208 | | 209 | | 208 | |
| properties of CFRP | 0° tensile strength (MPa) | | 2,973 | | 2,957 | | 3,012 | |
| | $G_{IC}$ (J/m$^2$) | | 336 | | 316 | | 325 | |
| | CAI (MPa) | | 299 | | 285 | | 281 | |

| | | | Example 13 | | Example 14 | |
|---|---|---|---|---|---|---|
| 1: first resin composition 2: second resin composition | | | 1 | 2 | 1 | 2 |
| epoxy resin | component [A1] | EPICLON ® HP-7200L (epoxy equivalent: 246 g/eq) | 30 | 30 | 30 | 30 |
| | component [A2-1] | Sumiepoxy ® ELM-434 | 50 | 50 | 50 | 50 |
| | component [A2-2] | EPICLON ® 830 | 20 | 20 | 20 | 20 |
| curing agent | component [B] | 4,4'-DDS (Seikacure-S) | 41 | 41 | 41 | 41 |
| | auxiliary curing agent | IDH-S | — | — | — | — |
| PES | component [C] | Virantage ® VW-10700RFP (weight average molecular weight 21,000 g/mol) | 6 | 13 | 6 | 13 |
| perfect spherical polymer particles | component [D] | polyamide particles 1 (sphericity 97) | 0 | 35 | 0 | 35 |
| electric conductivity particles | carbon black | #3230 B | — | — | — | — |
| | carbon particles | NICABEADS ® ICB2020 | — | 9 | — | 3 |
| [A2-1]/[A2-2] | | | 2.5 | 2.5 | 2.5 | 2.5 |
| | $H_E$/E of DDS | | 1.0 | 1.0 | 1.0 | 1.0 |
| | $H_F$/E of IDH | | — | — | — | — |
| properties of resin composition | viscosity increase rate (80° C. × 2 h) | | 10% | 10% | 10% | 10% |
| | G' (23° C., 77 rad/s) | | 3.8 × $10^5$ | 2.0 × $10^7$ | 3.8 × $10^5$ | 2.0 × $10^7$ |
| | glass transition temperature (° C.) | | 209 | | 209 | |
| properties of CFRP | 0° tensile strength (MPa) | | 2,962 | | 2,930 | |
| | $G_{IC}$ (J/m$^2$) | | 320 | | 351 | |
| | CAI (MPa) | | 288 | | 267 | |

TABLE 5

| | | | Example 18 | | Example 19 | | Example 20 | | Example 21 | | Example 22 | |
|---|---|---|---|---|---|---|---|---|---|---|---|---|
| 1: first resin composition 2: second resin composition | | | 1 | 2 | 1 | 2 | 1 | 2 | 1 | 2 | 1 | 2 |
| epoxy resin | component [A1] | EPICLON ® HP-7200L (epoxy equivalent: 246 g/eq) | 45 | 45 | — | — | 60 | 60 | 70 | 70 | 50 | 50 |
| | | XD-1000-2 L (epoxy equivalent: 240 g/eq) | — | — | 50 | 50 | — | — | — | — | — | — |
| | | EPICLON ® HP-7200 (epoxy equivalent: 260 g/eq) | — | — | — | — | — | — | — | — | — | — |
| | component [A2-1] | Sumiepoxy ® ELM-434 | 30 | 30 | 25 | 25 | 20 | 20 | 30 | 30 | 25 | 25 |
| | epoxy resin other than components [A1] to [A2-1] | EPICLON ® 830 | 25 | 25 | 25 | 25 | 20 | 20 | — | — | 25 | 25 |
| | | jER ® 825 | — | — | — | — | — | — | — | — | — | — |
| | | Araldite MY0510 | — | — | — | — | — | — | — | — | — | — |
| curing agent | component [B] | 4,4'-DDS (Seikacure-S) | 40 | 40 | 28 | 28 | 28 | 28 | 33 | 33 | — | — |
| | | 3,3-DDS (3,3'-DAS) | — | — | — | — | — | — | — | — | 35 | 35 |
| | component [F] | IDH | — | — | 5 | 5 | 4 | 4 | — | — | — | — |

TABLE 5-continued

| | | | | | | | | | | | | |
|---|---|---|---|---|---|---|---|---|---|---|---|---|
| PES | component [C] | Virantage ® VW-10700RFP (weight average molecular weight 21,000 g/mol) | 8 | 8 | 7 | 7 | 7 | 7 | 7 | 7 | 12 | 12 |
| | | Virantage ® VW-10200RFP (weight average molecular weight 46,500 g/mol) | — | — | — | — | — | — | — | — | — | — |
| thermoplastic resin particles | component [D-2] | polyamide particles 1 | — | 37 | — | 19 | — | 33 | — | 33 | — | 46 |
| mass of dicyclopentadiene type epoxy resin relative to total mass of epoxy resin composition (mass %) | | | 30 | 24 | 36 | 31 | 43 | 35 | 50 | 40 | 34 | 26 |
| $H_F/E$ ($H_F$: number of active hydrogen atoms in IDH, E: total number of epoxy groups) | | | — | | 0.20 | | 0.15 | | — | | — | |
| properties of resin composition | gelation hours (min) | | 101 | | 85 | | 87 | | — | | — | |
| | glass transition temperature (° C.) | | 206 | | 190 | | 193 | | 181 | | 180 | |
| properties of CFRP | 0° tensile strength (MPa) | | 3045 | | 3270 | | 3234 | | 3216 | | 3298 | |
| | 0° tensile strength at −60° C. (MPa) | | 2923 | | 3205 | | 3105 | | 3120 | | 3265 | |
| | strength retention rate (%) | | 96 | | 98 | | 96 | | 97 | | 99 | |
| | $G_{IC}$ (J/m$^2$) | | 520 | | 559 | | 542 | | 576 | | 626 | |
| | CAI (MPa) | | 335 | | 314 | | 336 | | 345 | | 376 | |

| | | | Example 23 | | Example 24 | |
|---|---|---|---|---|---|---|
| 1: first resin composition 2: second resin composition | | | 1 | 2 | 1 | 2 |
| epoxy resin | component [A1] | EPICLON ® HP-7200L (epoxy equivalent: 246 g/eq) | 50 | 50 | — | — |
| | | XD-1000-2 L (epoxy equivalent: 240 g/eq) | — | — | — | — |
| | | EPICLON ® HP-7200 (epoxy equivalent: 260 g/eq) | — | — | 45 | 45 |
| | component [A2-1] | Sumiepoxy ® ELM-434 | 25 | 25 | 40 | 40 |
| | epoxy resin other than components [A1] to [A2-1] | EPICLON ® 830 | — | — | 15 | 15 |
| | | jER ® 825 | 25 | 25 | — | — |
| | | Araldite MY0510 | — | — | — | — |
| curing agent | component [B] | 4,4'-DDS (Seikacure-S) | 29 | 29 | 31 | 31 |
| | | 3,3-DDS (3,3'-DAS) | — | — | — | — |
| | component [F] | IDH | 4 | 4 | — | — |
| PES | component [C] | Virantage ® VW-10700RFP (weight average molecular weight 21,000 g/mol) | 14 | 14 | 4 | 4 |
| | | Virantage ® VW-10200RFP (weight average molecular weight 46,500 g/mol) | — | — | — | — |
| thermoplastic resin particles | component [D-2] | polyamide particles 1 | — | 35 | — | 32 |
| mass of dicyclopentadiene type epoxy resin relative to total mass of epoxy resin composition (mass %) | | | 34 | 27 | 33 | 27 |
| $H_F/E$ ($H_F$: number of active hydrogen atoms in IDH, E: total number of epoxy groups) | | | 0.15 | | — | |
| properties of resin composition | gelation hours (min) | | — | | — | |
| | glass transition temperature (° C.) | | 196 | | 210 | |
| properties of CFRP | 0° tensile strength (MPa) | | 3434 | | 3066 | |
| | 0° tensile strength at −60° C. (MPa) | | 3421 | | 2882 | |
| | strength retention rate (%) | | 100 | | 94 | |
| | $G_{IC}$ (J/m$^2$) | | 624 | | 416 | |
| | CAI (MPa) | | 346 | | 327 | |

TABLE 6

| | | | Example 25 | | Example 26 | | Example 27 | | Example 28 | | Example 29 | | Example 30 | |
|---|---|---|---|---|---|---|---|---|---|---|---|---|---|---|
| 1: first resin composition 2: second resin composition | | | 1 | 2 | 1 | 2 | 1 | 2 | 1 | 2 | 1 | 2 | 1 | 2 |
| epoxy resin | component [A1] | EPICLON ® HP-7200L (epoxy equivalent: 246 g/eq) | 55 | 55 | 50 | 50 | 50 | 50 | 50 | 50 | 50 | 50 | 50 | 50 |
| | | XD-1000-2 L (epoxy equivalent: 240 g/eq) | — | — | — | — | — | — | — | — | — | — | — | — |
| | | EPICLON ® HP-7200 (epoxy equivalent: 260 g/eq) | — | — | — | — | — | — | — | — | — | — | — | — |

TABLE 6-continued

| | | | Example 25 | | Example 26 | | Example 27 | | Example 28 | | Example 29 | | Example 30 | |
|---|---|---|---|---|---|---|---|---|---|---|---|---|---|---|
| | component [A2-1] | Sumiepoxy ® ELM-434 | 40 | 40 | 10 | 10 | 25 | 25 | 25 | 25 | 25 | 25 | 25 | 25 |
| | epoxy resin other than components [A1] to [A2-1] | EPICLON ® 830 | 5 | 5 | 40 | 40 | 25 | 25 | 25 | 25 | — | — | 25 | 25 |
| | | jER ® 825 | — | — | — | — | — | — | — | — | | | — | — |
| | | Araldite MY0510 | — | — | — | — | — | — | — | — | 25 | 25 | — | — |
| curing agent | component [B] | 4,4'-DDS (Seikacure-S) | 31 | 31 | 28 | 28 | 29 | 29 | 29 | 29 | 39 | 39 | 24 | 24 |
| | | 3,3-DDS (3,3'-DAS) | — | — | — | — | — | — | — | — | — | — | — | — |
| | component [F] | IDH | — | — | 4 | 4 | 11 | 11 | 0.3 | 0.3 | 2 | 2 | 8 | 8 |
| PES | component [C] | Virantage ® VW-10700RFP (weight average molecular weight 21,000 g/mol) | — | — | 7 | 7 | 3 | 3 | 18 | 18 | 7 | 7 | 16 | 16 |
| | | Virantage ® VW-10200RFP (weight average molecular weight 46,500 g/mol) | 4 | 4 | — | — | — | — | — | — | — | — | — | — |
| thermoplastic resin particles | component [D-2] | polyamide particles 1 | — | 11 | — | 33 | — | 33 | — | 36 | — | 33 | — | 9 |
| mass of dicydopentadiene type epoxy resin content relative to entire mass of epoxy resin composition (mass %) | | | 41 | 38 | 36 | 29 | 35 | 28 | 34 | 27 | 34 | 28 | 34 | 32 |
| $H_F$/E ($H_F$: number of active hydrogen atoms in IDH, E: total number of epoxy groups) | | | — | | 0.15 | | 0.40 | | 0.01 | | 0.05 | | 0.30 | |
| properties of resin composition | gelation hours (min) | | | | — | | 79 | | 100 | | 95 | | 81 | |
| | glass transition temperature (° C.) | | 218 | | 187 | | 181 | | 190 | | 211 | | 189 | |
| properties of CFRP | 0° tensile strength (MPa) | | 3015 | | 3375 | | 3063 | | 3580 | | 3170 | | 3501 | |
| | 0° tensile strength at −60° C. (MPa) | | 2804 | | 3341 | | 2879 | | 3652 | | 3012 | | 3431 | |
| | strength retention rate (%) | | 93 | | 99 | | 94 | | 102 | | 95 | | 98 | |
| | $G_{IC}$ (J/m$^2$) | | 463 | | 521 | | 532 | | 648 | | 479 | | 479 | |
| | CAI (MPa) | | 293 | | 321 | | 342 | | 355 | | 364 | | 253 | |

TABLE 7

| | | | Reference example 2 | | Comparative example 8 | | Comparative example 9 | | Comparative example 10 | | Comparative example 11 | |
|---|---|---|---|---|---|---|---|---|---|---|---|---|
| 1: first resin composition 2: second resin composition | | | 1 | 2 | 1 | 2 | 1 | 2 | 1 | 2 | 1 | 2 |
| epoxy resin | component [A1] | EPICLON ® HP-7200L (epoxy equivalent: 246 g/eq) | 20 | 20 | 90 | 90 | 0 | 0 | — | — | — | — |
| | dicyclopentadiene type epoxy resin with epoxy equivalent of 266 or more | EPICLON ® HP-7200H (epoxy equivalent: 278 g/eq) | — | — | — | — | — | — | 50 | 50 | — | — |
| | | EPICLON ® HP-7200HHH (epoxy equivalent: 280 g/eq) | — | — | — | — | — | — | — | — | 50 | 50 |
| | component [A2-1] | Sumiepoxy ® ELM-434 | 40 | 40 | 10 | 10 | 25 | 25 | 25 | 25 | 25 | 25 |
| | epoxy resin other than components [A1] to [A2-1] | EPICLON ® 830 | 40 | 40 | — | — | 25 | 25 | 25 | 25 | 25 | 25 |
| | | jER ® 825 | — | — | — | — | — | — | — | — | — | — |
| | | EPICLON ® HP-4770 | — | — | — | — | 50 | 50 | — | — | — | — |
| curing agent | component [B] | 4,4'-DDS (Seikacure-S) | 40 | 40 | 28 | 28 | 37 | 37 | 34 | 34 | 33 | 33 |
| | | 3,3-DDS (3,3'-DAS) | — | — | — | — | — | — | — | — | — | — |
| | component [F] | isophthalic acid dihydrazide | — | — | — | — | — | — | — | — | — | — |
| PES | component [C] | Virantage ® VW-10700RFP (weight average molecular weight 21,000 g/mol) | 7 | 7 | 7 | 7 | 7 | 7 | 7 | 7 | 7 | 7 |
| | | Virantage ® VW-10200RFP (weight average molecular weight 46,500 g/mol) | — | — | — | — | — | — | — | — | — | — |
| thermoplastic resin particles | component [D-2] | polyamide particles 1 | — | 35 | — | 32 | — | 34 | — | 33 | — | 33 |
| mass of dicyclopentadiene type epoxy resin relative to total mass of epoxy resin composition (mass %) | | | 14 | 11 | 67 | 54 | 0 | 0 | 35 | 29 | 36 | 29 |
| properties of resin composition | glass transition temperature (° C.) | | 216 | | — | | 184 | | — | | — | |
| properties of CFRP | 0° tensile strength (MPa) | | 2977 | | — | | 2985 | | — | | — | |
| | 0° tensile strength at −60° C. (MPa) | | 2620 | | — | | 2657 | | — | | — | |
| | strength retention rate (%) | | 88 | | — | | 89 | | — | | — | |
| | $G_{IC}$ (J/m$^2$) | | 287 | | — | | 100 | | — | | — | |
| | CAI (MPa) | | 321 | | — | | 362 | | — | | — | |

TABLE 7-continued

| | | | Comparative example 12 | | Comparative example 13 | | Comparative example 14 | |
|---|---|---|---|---|---|---|---|---|
| 1: first resin composition 2: second resin composition | | | 1 | 2 | 1 | 2 | 1 | 2 |
| epoxy resin | component [A1] | EPICLON ® HP-7200L (epoxy equivalent: 246 g/eq) | 0 | 0 | 40 | 40 | 50 | 50 |
| | dicyclopentadiene type epoxy resin with epoxy equivalent of 266 or more | EPICLON ® HP-7200H (epoxy equivalent: 278 g/eq) | — | — | — | — | — | — |
| | | EPICLON ® HP-7200HHH (epoxy equivalent: 280 g/eq) | — | — | — | — | — | — |
| | component [A2-1] | Sumiepoxy ® ELM-434 | 75 | 75 | 5 | 5 | 40 | 40 |
| | epoxy resin other than components [A1] to [A2-1] | EPICLON ® 830 | 25 | 25 | 55 | 55 | 10 | 10 |
| | | jER ® 825 | — | — | — | — | — | — |
| | | EPICLON ® HP-4770 | — | — | — | — | — | — |
| curing agent | component [B] | 4,4-DDS (Seikacure-S) | 48 | 48 | 33 | 33 | 35 | 35 |
| | | 3,3-DDS (3,3'-DAS) | — | — | — | — | — | — |
| | component [F] | isophthalic acid dihydrazide | — | — | — | — | — | — |
| PES | component [C] | Virantage ® VW-10700RFP (weight average molecular weight 21,000 g/mol) | 8 | 8 | 7 | 7 | 0 | 0 |
| | | Virantage ® VW-10200RFP (weight average molecular weight 46,500 g/mol) | — | — | — | — | — | — |
| thermoplastic resin particles | component [D-2] | polyamide particles 1 | — | 48 | — | 33 | — | 9 |
| mass of dicyclopentadiene type epoxy resin relative to total mass of epoxy resin composition (mass %) | | | 0 | 0 | 29 | 23 | 37 | 35 |
| properties of resin composition | glass transition temperature (° C.) | | 210 | | 170 | | 216 | |
| properties of CFRP | 0° tensile strength (MPa) | | 2790 | | 3069 | | 2955 | |
| | 0° tensile strength at −60° C. (MPa) | | 2134 | | 2854 | | 2630 | |
| | strength retention rate (%) | | 76 | | 93 | | 89 | |
| | $G_{IC}$ (J/m$^2$) | | 277 | | 561 | | 384 | |
| | CAI (MPa) | | 294 | | 345 | | 247 | |

TABLE 8

| | | | Example 31 | | Example 32 | |
|---|---|---|---|---|---|---|
| 1: first resin composition 2: second resin composition | | | 1 | 2 | 1 | 2 |
| epoxy resin | component [A1] | EPICLON ® HP-7200L (epoxy equivalent: 246 g/eq) | 50 | 50 | 50 | 50 |
| | component [A2-1] | Sumiepoxy ® ELM-434 | 25 | 25 | 25 | 25 |
| | epoxy resin other than components [A1] to [A2-1] | EPICLON ® 830 | 25 | 25 | 25 | 25 |
| curing agent | component [B] | 4,4'-DDS (Seikacure-S) | 35 | 35 | 35 | 35 |
| | component [F] | IDH-S | — | — | — | — |
| PES | component [C] | Virantage ® VW-10700RFP (weight average molecular weight 21,000 g/mol) | 8 | 8 | 8 | 8 |
| | | Virantage ® VW-10200RFP (weight average molecular weight 46,500 g/mol) | — | — | — | — |
| thermoplastic resin particles | component [D-2] | polyamide particles 1 | — | 35 | — | 35 |
| electric conductivity particles | carbon black | #3230 B | 2 | 2 | — | — |
| | carbon particles | NICABEADS ® ICB2020 | — | 9 | — | — |
| mass of dicyclopentadiene type epoxy resin relative to total mass of epoxy resin composition (mass %) | | | 35 | 27 | 35 | 28 |
| properties of resin composition | glass transition temperature (° C.) | | 194 | | 195 | |
| properties of CFRP | 0° tensile strength (MPa) | | 3277 | | 3259 | |
| | 0° tensile strength at −60° C. (MPa) | | 3194 | | 3141 | |
| | strength retention rate (%) | | 97 | | 96 | |
| | thickness-directional volume resistivity (Ωcm) | | 14 | | $10^5$ | |
| | CAI (MPa) | | 301 | | 314 | |

TABLE 9

| | | | Refencence example 1 | | Comparative example 1 | | Comparative example 15 | | Example 6 | | Example 33 | |
|---|---|---|---|---|---|---|---|---|---|---|---|---|
| 1: first resin composition 2: second resin composition | | | 1 | 2 | 1 | 2 | 1 | 2 | 1 | 2 | 1 | 2 |
| epoxy resin | component [A1] | EPICLON ® HP-7200L (epoxy equivalent: 246 g/eq) | 50 | 50 | 3 | 3 | 0 | 0 | 10 | 10 | 0 | 10 |
| | component [A2-1] | Sumiepoxy ® ELM-434 | 30 | 30 | 50 | 50 | 60 | 60 | 60 | 60 | 55 | 55 |
| | component [A3] | GOT | 0 | 0 | 0 | 0 | 15 | 15 | 30 | 30 | 25 | 25 |
| | component [A4] | EPICLON ® 830 | 20 | 20 | 47 | 47 | 25 | 25 | 0 | 0 | 20 | 10 |
| curing agent | component [B] | 4,4'-DDS (Seikacure-S) | 35 | 35 | 44 | 44 | 44 | 44 | 45 | 45 | 40 | 39 |
| PES | component [C] | Virantage ® VW-10700RFP (weight average molecular weight 21,000 g/mol) | 12 | 8 | 6 | 13 | 6 | 13 | 6 | 13 | — | — |
| | | Virantage ® VW-10200RFP (weight average molecular weight 46,500 g/mol) | — | — | — | — | — | — | — | — | 12 | 15 |
| perfect spherical polymer particles | component [D] | polyamide particles 1 (sphericity 97) | 0 | 32 | 0 | 35 | 0 | 35 | 0 | 35 | — | — |
| | | polyamide particles 2 (sphericity 96) | — | — | — | — | — | — | — | — | — | 35 |
| electric conductivity particles | carbon particles | NICABEADS ® ICB2020 | — | — | — | — | — | — | — | — | — | 3 |
| $H_F$/E of DDS | | | — | — | — | — | — | — | 1.0 | 1.0 | 1.0 | 1.0 |
| properties of resin composition | viscosity increase rate (80° C. × 2 h) | | — | — | — | — | — | — | 10% | 10% | 10% | 10% |
| | G' (23° C., 77 rad/s) | | $6.0 \times 10^7$ | $3.8 \times 10^7$ | $9.0 \times 10^4$ | $6.8 \times 10^5$ | — | — | $2.3 \times 10^5$ | $3.5 \times 10^6$ | $9.3 \times 10^4$ | $3.2 \times 10^6$ |
| | glass transition temperature (° C.) | | — | — | 198 | | — | — | — | | 195 | 194 |
| properties of CFRP | 0° tensile strength (MPa) | | 3,300 | | 2,705 | | 2,810 | | 2,950 | | 2,940 | |
| | $G_{IC}$ (J/m²) | | — | — | — | | — | — | — | | 322 | 290 |
| | CAI (MPa) | | — | — | — | | — | — | — | | 301 | 278 |

The invention claimed is:

1. A prepreg comprising carbon fiber and a resin composition comprising components [A] to [D]

[A]: an epoxy resin containing [A1] and [A2],

[A1]: a dicyclopentadiene type epoxy resin,

[A2]: an epoxy resin containing [A2-1] and [A2-2],

[A2-1]: a tetrafunctional liquid type epoxy resin,

[A2-2]: a bifunctional liquid type epoxy resin,

[B]: diaminodiphenyl sulfone,

[C]: polyethersulfone, and

[D]: perfect spherical polymer particles, wherein:

the epoxy resin of component [A] contains [A1] and [A2], with [A1] having an epoxy equivalent of 200 g/eq or more and 253 g/eq or less and accounting for 5 parts by mass or more and 45 parts by mass or less relative to 100 parts by mass of the epoxy resin of component [A], and with [A2] accounting for 55 parts by mass or more and 95 parts by mass or less relative to 100 parts by mass of the epoxy resin of component [A],

[A2] includes at least [A2-1] and [A2-2], the mass ratio of [A2-1]/[A2-2] being 0.7 or more and 4.0 or less, the resin composition shows a viscosity increase rate of 20% or less when maintained at 80° C. for 2 hours, and component [C] has a weight average molecular weight of 10,000 to 30,000 g/mol and accounts for 2 parts by mass or more and 11.3 parts by mass or less relative to 100 parts by mass of the epoxy resin of component [A].

2. The prepreg as set forth in claim 1, wherein the resin composition comprises a first resin composition and a second resin composition, where the first resin composition impregnates an inner layer of the prepreg and the second resin composition is located in a surface layer of the prepreg, wherein the first resin composition has a storage elastic modulus G' of $1\times10^4$ Pa or more and $2\times10^6$ Pa or less as measured at 23° C. and 77 rad/s.

3. The prepreg as set forth in claim 1, comprising an isophthalic acid dihydrazide, wherein the ratio $H_F$/E between the total number of active hydrogen atoms ($H_F$) in the isophthalic acid dihydrazide and the total number of epoxy groups (E) in the component [A] meets the following relation: $0.05 \leq H_F/E \leq 0.3$ or less.

4. The prepreg as set forth in claim 1, comprising conductive particles.

5. A prepreg tape comprising the prepreg as set forth in claim 1.

6. A carbon fiber reinforced plastic produced by molding the prepreg tape as set forth in claim 5.

7. A carbon fiber reinforced plastic produced by molding the prepreg as set forth in claim 1.

8. The prepreg as set forth in claim 1, wherein a carbon fiber reinforced plastic formed from the prepreg has a mode-I interlaminar toughness ($G_{IC}$) of 250 J/m² or more as determined by JIS K7086 (1993).

9. A prepreg comprising component [E] impregnated with a resin composition comprising components [A] to [D-2]

[A]: an epoxy resin containing [A1] and [A2],

[A1]: a dicyclopentadiene type epoxy resin,

[A2]: an epoxy resin containing [A2-1] and [A2-2],

[A2-1]: a tetrafunctional liquid type epoxy resin,

[A2-2]: a bifunctional liquid type epoxy resin,

[B] diaminodiphenyl sulfone,

[C] polyethersulfone,

[D-2] thermoplastic resin particles, and

[E] carbon fiber, wherein:

[A1] has an epoxy equivalent of 200 g/eq or more and 253 g/eq or less and accounts for 45 parts by mass or more and 80 parts by mass or less relative to 100 parts by mass of the epoxy resin of component [A], and [A2-1] accounts for 10 parts by mass or more and 40 parts by mass or less relative to 100 parts by mass of the epoxy resin of component [A], and component [C] has a weight average molecular weight of 10,000 to 30,000 g/mol.

10. A prepreg comprising carbon fiber and a resin composition comprising components [A] to [D]

[A]: an epoxy resin containing [A1], [A2-1], [A3], and [A4],

[A1]: a dicyclopentadiene type epoxy resin,

[A2-1]: a tetrafunctional liquid type epoxy resin,

[A3]: a bifunctional glycidyl aniline type epoxy resin,

[A4]: an epoxy resin other than [A1], [A2-1], and [A3],

[B]: diaminodiphenyl sulfone,

[C]: polyethersulfone, and

[D]: perfect spherical polymer particles, wherein:

the epoxy resin of component [A] contains 2 parts by mass or more and 15 parts by mass or less of [A1], 45 parts by mass or more and 65 parts by mass or less of [A2-1], 15 parts by mass or more and 35 parts by mass or less of [A3], and 0 parts by mass or more and 35 parts by mass or less of [A4], relative to 100 parts by mass of the epoxy resin of component [A], and

[A1] has an epoxy equivalent of 200 g/eq or more and 253 g/eq or less.

* * * * *